United States Patent
Ludlow

(10) Patent No.: US 12,440,805 B2
(45) Date of Patent: *Oct. 14, 2025

(54) WATER ELECTROLYZER CELLS AND METHODS FOR ELECTROLYZING WATER

(71) Applicant: Daryl J. Ludlow, Lake George, NY (US)

(72) Inventor: Daryl J. Ludlow, Lake George, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/086,691

(22) Filed: Mar. 21, 2025

(65) Prior Publication Data

US 2025/0214034 A1    Jul. 3, 2025

Related U.S. Application Data

(63) Continuation of application No. 17/934,341, filed on Sep. 22, 2022, now Pat. No. 12,397,262.

(51) Int. Cl.
*B01D 53/32*    (2006.01)
*C25B 1/04*     (2021.01)
*C25B 15/08*    (2006.01)

(52) U.S. Cl.
CPC .......... *B01D 53/326* (2013.01); *C25B 15/085* (2021.01); *B01D 2256/16* (2013.01); *C25B 1/04* (2013.01)

(58) Field of Classification Search
CPC ................................ C25B 1/02; B01D 53/326
See application file for complete search history.

(56) References Cited

U.S. PATENT DOCUMENTS

| | | |
|---|---|---|
| 3,489,670 A | 1/1970 | Maget |
| 9,478,822 B2 | 10/2016 | Blanchet |
| 10,722,841 B2 | 7/2020 | Ukai et al. |
| 2004/0211679 A1 | 10/2004 | Wong et al. |
| 2007/0246373 A1 | 10/2007 | Ludlow et al. |

(Continued)

FOREIGN PATENT DOCUMENTS

| | | | |
|---|---|---|---|
| EP | 4006209 A1 | | 1/2022 |
| WO | WO 2022172120 A1 | * | 8/2022 |

OTHER PUBLICATIONS

International Search Report from corresponding PCT application PCT/US2023/072803, dated Jun. 13, 2024, 5 pages.

(Continued)

*Primary Examiner* — Hosung Chung
(74) *Attorney, Agent, or Firm* — Tech Valley Patent, LLC; John Pietrangelo

(57) ABSTRACT

Hydrogen gas purifier electrochemical cells, systems for purifying hydrogen gas, and methods for purifying hydrogen gas are provided. The cells, systems, and methods employ double membrane electrode (DMEA) electrochemical cells that enhance purification while avoiding the complexity and cost of conventional cells. The purity of the hydrogen gas produced by the cells, systems, and methods can be enhanced by removing at least some intermediate gas impurities from the cells. The purity of the hydrogen gas produced by the cells, systems, and methods can also be enhanced be introducing hydrogen gas to the cells to replenish any lost hydrogen. Water electrolyzing electrochemical cells and methods of electrolyzing water to produce hydrogen gas are also disclosed.

22 Claims, 8 Drawing Sheets

(56) References Cited

U.S. PATENT DOCUMENTS

| | | |
|---|---|---|
| 2010/0243475 A1 | 9/2010 | Eisman et al. |
| 2010/0266923 A1* | 10/2010 | Mcelroy ............ H01M 8/04798 |
| | | 429/444 |
| 2017/0233878 A1 | 8/2017 | Yamakura et al. |
| 2019/0336911 A1 | 11/2019 | Ludlow et al. |
| 2021/0151725 A1 | 5/2021 | Madden et al. |
| 2021/0285427 A1 | 9/2021 | Nakaue et al. |

OTHER PUBLICATIONS

Written Opinion from corresponding PCT application PCT/US2023/072803, dated Jun. 13, 2024, 9 pages.

Sedlak, et al., "Hydrogen Recovery and Purification Using the Solid Polymer Electrolyte Electrolysis Cell," International Journal of Hydrogen Energy, vol. 6, pp. 45-51, 1980.

Venugopalan, et al.. "Electrochemical Pumping for Challenging Hydrogen Separations," ACS Energy Letters 2022 7 (4), 1322-1329.

Fishel, et al., "Electrochemical Hydrogen Pumping," High Temperature Polymer Electrolyte Fuel Cells, Chapter 24, Li, et al. (eds.), Springer, 2016, pp. 527-540.

* cited by examiner

WATER ELECTROLYZER CELLS AND METHODS FOR ELECTROLYZING WATER

CROSS-REFERENCE TO RELATED APPLICATIONS

This application is a continuation application of pending U.S. application Ser. No. 17/934,341, filed in Sep. 22, 2022, the disclosure of which is included by reference herein in its entirety.

BACKGROUND OF THE INVENTION

Technical Field

This invention is generally related to the electrochemical purification and/or compression of hydrogen gas. Specifically, aspects of the invention include electrochemical cells, systems, and methods of purifying and/or compressing hydrogen gas employing one or more membrane electrode assemblies (MEAs) in a single MEA cell and avoiding external handling of gas flows between separate MEA cells.

Description of Related Art

As known in the art, there are many uses for high-purity hydrogen, that is, hydrogen gas having a hydrogen content greater than 99.99 percent, by volume. However, hydrogen gas is commonly found mixed with other, undesirable gases, for example, nitrogen, argon, carbon dioxide, oxygen, and carbon monoxide, among others. Thus, there is a need in the art for improved methods of isolating the hydrogen gas from the undesirable gases to provide a purer form of hydrogen gas.

Hydrogen purification is not easily accomplished. Hydrogen gas is generally difficult to separate from other gases due to, among other things, the hydrogen molecule being relatively small and hydrogen gas being flammable. Existing means for purifying hydrogen gas from undesirable non-hydrogen gases include molecular sieves, membranes, palladium membranes, and electrochemical hydrogen pumps (EHPs).

Molecular sieves separate hydrogen molecules by selective adsorption, preferentially retaining some molecules more favorably than others. In many cases, however, molecular sieve adsorption systems have undesirably insignificant impact on hydrogen gas purity. One such case is the separation of nitrogen gas ($N_2$) and hydrogen gas ($H_2$).

Palladium selectively allows only hydrogen atoms to pass through the metal, resulting in the evolution of highly pure hydrogen. However, palladium is expensive, the process requires compressed gas, and high hydrogen recovery rates require high pressure and/or large masses of palladium.

Electrochemical hydrogen pumps (EHPs) selectively extract hydrogen from mixtures of hydrogen gas and other gases, such as, nitrogen and argon. However, typically, other undesirable gases diffuse across the pump's membrane and result in limited hydrogen gas purity. As a result, one might use multiple individual electrochemical hydrogen pumps, each EHP having associated housings, cell stacks, feed conduits, and exhaust conduits, among other separate hardware and control systems, in series to attempt to purify a hydrogen gas stream twice, and thus increase the hydrogen gas purity. However, such configurations require multiple separate electrochemical pump cell stacks and multiple sets of electrochemical stack hardware connected together. This undesirably results in increased system complexity and increased costs.

Another approach for purifying hydrogen is to increase membrane thickness in the electrochemical cell. However, increasing membrane thickness typically is limited to only decrease impurity diffusion across the membrane as a function of the thickness of the membrane. Other approaches for purifying hydrogen gas, require undesirable gas compression, undesirable multiple pumps, recover less hydrogen gas, consume more energy, and/or do not produce the high purity hydrogen gas required by today's hydrogen gas users, such as, the semiconductor industry.

Accordingly, there is an need in the art for improved hydrogen purification systems, methods, and devices.

SUMMARY OF THE INVENTION

The embodiments of the present invention, in their various aspects, address this recognized need by providing improved hydrogen purification that meets, and can exceed, the hydrogen gas purities required by various applications. Aspects of the present invention employ a unique combination of membrane electrode assemblies (MEAs) or "double" MEAs (DMEAs) that have shown to provide the enhance hydrogen gas purities that today's users require.

One embodiment of the invention is a hydrogen gas purifier cell comprising or including: a first membrane electrode assembly (MEA) comprising: a first anode positioned to contact a first gas stream having a first hydrogen gas content and a first impurity gas content, the first anode containing a catalyst, for example, a platinum group-containing catalyst, adapted to oxidize at least some of first hydrogen gas content to produce hydrogen ions and electrons; a first electrolyte, for example, an acidic electrolyte, positioned and adapted to receive and transfer at least some of the hydrogen ions produced by the first anode; and a first cathode positioned to receive at least some of the hydrogen ions transferred by the first electrolyte, the first cathode containing a catalyst adapted to reduce the at least some of the hydrogen ions to produce a second gas stream having a second hydrogen gas content greater than the first hydrogen gas content and a second impurity gas content less than the first impurity gas content; and a second MEA comprising or including a second anode positioned to receive the second gas stream from the first cathode of the first MEA, the second anode containing a catalyst adapted to oxidize at least some of second hydrogen gas content in the second gas stream to produce hydrogen ions and electrons; a second electrolyte, for example, an acidic electrolyte, positioned and adapted to receive and transfer at least some of the hydrogen ions produced by the second anode; and a second cathode positioned to receive at least some of the hydrogen ions transferred by the second electrolyte of the second MEA, the second cathode containing a catalyst adapted to reduce the at least some of the hydrogen ions and electrons to produce a third gas stream having a third hydrogen gas content greater than the first hydrogen gas content and a third impurity gas content less than the first impurity gas content.

In one aspect, the purifier cell may further comprise at least one passage between the first electrolyte and the second electrolyte for discharging at least some of the second gas stream. For example, the at least one passage may be located between the first cathode and the second anode. In one aspect, the at least one passage located between the first cathode and the second anode may comprise spaces or voids between mating surfaces of the first cathode and the second anode. In another aspect, the purifier cell may further include a gas-permeable layer or gas diffusion layer (GDL) between the first cathode and the second anode, and the GDL may provide the at least one passage for discharging at least some of the second gas stream. In another aspect, a gas-distribution or flow field insert, with or without a GDL, may be positioned between a first cathode and a second anode to promote or enhance the distribution of the second gas stream across the surface of the second anode. The flow field insert may be an electrically-conductive porous or a perforated plate, for example, a porous or perforated metallic plate, or a screen-like insert, for example, a metallic screen-like insert, positioned and adapted to provide at least some gas distribution about the surface of the second anode. In another aspect, the at least one passage for discharging at least some of the second gas stream may be at least one channel in close proximity to of the first cathode, the second anode, or both.

In another aspect, the purifier cell may further comprise or include at least one passage between the first electrolyte and the second electrolyte for introducing hydrogen-containing gas to the second gas stream. For example, the at least one passage may be located between the first cathode and the second anode. In one aspect, the at least one passage may be spaces or voids between mating surfaces of the first cathode and the second anode. In one aspect, the purifier cell may further include a gas-permeable layer or gas diffusion layer (GDL) between the first cathode and the second anode, and the GDL may provide the at least one passage for introducing hydrogen-containing gas to the second gas stream. In another aspect, a gas-distribution or flow field insert, with or without a GDL, may be positioned between the first cathode and the second anode to promote or enhance the distribution of the second gas stream across the surface of second anode. The flow field insert may be a porous or perforated plate, for example, a porous or perforated metallic plate, or a screen-like insert, for example, a metallic screen-like insert, positioned and adapted to provide at least some gas distribution about the surface of the second anode.

In another aspect, the at least one passage for introducing hydrogen-containing gas to the second gas stream may comprise at least one channel in close proximity to the first cathode, the second anode, or both.

In one aspect, the first gas stream may have a first gas pressure and the third gas stream may have a third gas pressure, wherein the third gas pressure is greater than the first gas pressure. In other aspects, the third gas pressure may be less than the first gas pressure.

Another embodiment of the invention is a hydrogen gas purifying system comprising or including: at least one hydrogen gas purifier cell as disclosed herein; and at least two electrically conductive plates, one of the at least two plates mounted to a first end of the at least one hydrogen gas purifier cell, and one of the at least two plates mounted to a second end of the at least one hydrogen gas purifier cell, opposite the first end. For example, in one aspect, the at least one hydrogen gas purifier cell may comprise a plurality of hydrogen gas purifier cells, for example, a stack of hydrogen gas purifier cells.

Another embodiment of the invention is a method for reducing an impurity gas content of a gas stream having a hydrogen gas content and an impurity gas content, the method comprising or including: introducing a first gas stream having a first hydrogen content and a first impurity gas content to a first anode containing a catalyst; in the first anode, catalytically oxidizing at least some of the first hydrogen gas content to produce hydrogen ions and electrons; transferring at least some of the hydrogen ions and at least some of the impurity gas content through a first electrolyte to a first cathode containing a catalyst; in the first cathode, catalytically reducing the at least some of the hydrogen ions transferred through the first electrolyte to produce a second gas stream having a second hydrogen content greater than the first hydrogen content and a second impurity gas content less than the first impurity gas content; introducing the second gas stream to a second anode having a catalyst; in the second anode, catalytically oxidizing at least some of the second hydrogen gas content in the second gas stream to produce hydrogen ions and electrons; transferring at least some of the hydrogen ions produced at the second anode and at least some of the second impurity gas content through a second electrolyte to a second cathode; and in the second cathode, catalytically reducing the at least some of the hydrogen ions transferred through the second electrolyte to produce a third gas stream having a third hydrogen content greater than the first hydrogen content and a third impurity gas content less than the first impurity gas content.

In one aspect, the method may further include removing at least some of the second gas stream to produce a modified gas stream having a non-hydrogen gas partial pressure lower than a partial pressure of the non-hydrogen gas in the second gas stream. In another aspect, introducing the second gas stream to the second anode comprises introducing the modified gas stream to the second anode. In one aspect, removing at least some of the second gas stream may be practiced by removing at least some of the second gas stream though a passage between the first electrolyte and the second electrolyte, for example, the passage may be located between the first cathode and the second anode. In one aspect, the passage for removing at least some of the second gas stream may be spaces or voids between mating surfaces of the first cathode and the second anode. In another aspect, removing the at least some of the second gas stream may be practiced by removing the at least some of the second gas stream through a gas-diffusion layer (GDL) and/or flow field insert positioned between the first cathode and the second anode. In another aspect, removing the at least some of the second gas stream may be practiced by removing the at least some of the second gas stream though at least one channel in close proximity to the first cathode, the second cathode, or both.

In another aspect, the method may further include introducing some hydrogen gas to the second gas stream, for example, a "make-up" gas stream. In one aspect, introducing some hydrogen gas to the second gas stream may replenish at least some hydrogen gas removed from the second gas stream. In one aspect, the make-up hydrogen gas stream may comprise at least some of the third gas stream having a third hydrogen content. For example, the third gas stream may be introduced to the second gas stream by diffusion through the second electrolyte. This diffusion through the second electrolyte may be referred to as "back diffusion" of at least some of the third gas stream having the third hydrogen content through the second electrolyte to the second gas stream.

In one aspect, by employing the electrochemical cells and methods disclosed herein, the purified hydrogen gas produced, for example, the third impurity gas content, may be at least 100 times lower, by volume, than the impurity content of the input gas content, for example, the first impurity gas content. In another aspect, the impurity gas content of the hydrogen gas produced may be at least 1,000 times lower, 10,000 times lower, 100,000 times lower, or even 1,00,000 times lower or less, than the impurity content of the first hydrogen gas stream.

In one aspect, the impurity gas content of the hydrogen gas produced by any of the methods, cells, and systems of the present invention, for example, in the third gas stream, may be at most 100 parts per million [ppm], that is, the third gas stream may contain at most 100 ppm of impurity gas. In other aspects of the invention, the impurity gas content of the hydrogen gas produced may be at most 20 ppm, or at most 10 ppm; or at most 5 ppm, or at most 2 ppm, or at most 1 ppm. In other aspects of the invention, the impurity gas content of the hydrogen gas produced may be at most 750 parts per billion [ppb](that is, at most 0.750 ppm); or at most 500 ppb; or at most 200 ppb; or even at most 100 ppb. As known in the art, these impurity contents of the hydrogen gas produced, for example, a content of 1,000 times lower than the impurity gas content of the first gas stream, or an impurity gas content in ppm or in ppb, are typically "on a dry basis." As known in the art, "on a dry basis" implies that there may be some water vapor in the gas stream produced that has yet to be reduced or removed, for example, in a subsequent drying process.

Another embodiment of the invention is a method for reducing an impurity gas content of a gas stream having a hydrogen gas content and an impurity gas content, the method comprising or including: introducing a first gas stream having a first hydrogen content and a first impurity gas content to a first membrane electrode assembly (MEA) having a first anode containing a catalyst, a first electrolyte, and a first cathode containing a catalyst to produce a second gas stream having a second hydrogen gas content and a second impurity gas content; and passing the second gas stream directly to a second MEA having a second anode containing a catalyst, an second electrolyte, and a second cathode containing a catalyst to produce a third gas stream having a third hydrogen gas content greater than the first hydrogen content and a third impurity gas content less than the first impurity gas content.

In one aspect, the first MEA and the second MEA may be positioned in a hydrogen purifying cell, and passing the second gas stream directly to a second MEA may comprise passing the second gas stream to the second MEA without allowing the second gas stream to leave the hydrogen purifying cell.

In one aspect, the method may further include removing at least some of the second gas stream to produce a modified second gas stream having a reduced non-hydrogen gas partial pressure than the second gas stream, and then introducing the modified second gas stream having a reduced non-hydrogen gas partial pressure to the second MEA. In one aspect, the method may further include introducing at least some hydrogen gas to the second gas stream or to the modified second gas stream.

A further embodiment of the invention is a hydrogen gas purifier cell comprising or including: a membrane electrode assembly (MEA) comprising: an anode positioned to contact a first gas stream having a first hydrogen gas content and a first impurity gas content, the anode containing a catalyst adapted to oxidize at least some of first hydrogen gas content to produce hydrogen ions and electrons; a first electrolyte positioned and adapted to receive and transfer at least some of the hydrogen ions received from the anode; a dual electrode positioned to receive at least some of the hydrogen ions transferred by the first electrolyte, the dual cathode containing a catalyst adapted to reduce the at least some of the hydrogen ions to produce a second gas stream having a second hydrogen gas content and to oxidize at least some of second hydrogen gas content in the second gas stream to produce hydrogen ions and electrons; a second electrolyte positioned and adapted to receive and transfer at least some of the hydrogen ions received from the dual electrode; and a cathode positioned to receive at least some of the hydrogen ions transferred by the second electrolyte, the cathode containing a catalyst adapted to reduce the at least some of the hydrogen ions to produce a third gas stream having a third hydrogen gas content greater than the first hydrogen gas content and a third impurity gas content less than the first impurity gas content.

In one aspect, the hydrogen gas purifier cell further comprises at least one passage for removing at least some of the second gas stream. For example, the at least one passage for removing at least some of the second gas stream may be the dual electrode, for example, a permeability of the dual electrode; a gas permeable diffusion layer; and/or the second electrolyte.

In one aspect, the hydrogen gas purifier cell further comprises at least one passage for introducing at least some hydrogen gas to the second gas stream. For example, the at least one passage for introducing at least some hydrogen gas may be the dual electrode, for example, a permeability of the dual electrode; a gas permeable diffusion layer; and/or the second electrolyte, for instance, via "back diffusion."

A further embodiment of the invention is a method of purifying hydrogen gas comprising or including: introducing a first gas stream having a first hydrogen gas content and a first impurity gas content to an anode containing a catalyst; in the anode, catalytically oxidizing at least some of first hydrogen gas content to produce hydrogen ions and electrons; transferring at least some of the hydrogen ions produced in the anode through a first electrolyte to a dual electrode; in the dual electrode, catalytically reducing the at least some of the hydrogen ions transferred through the first electrolyte to produce a second gas stream having a second hydrogen gas content, and catalytically oxidizing at least some of second hydrogen gas content in the second gas stream to produce hydrogen ions and electrons; transferring at least some of the hydrogen ions produced in the dual electrode through a second electrolyte to a cathode, and in the cathode, catalytically reducing the at least some of the hydrogen ions transferred through the second electrolyte to produce a third gas stream having a third hydrogen gas content greater than the first hydrogen gas content and a third impurity gas content less than the first impurity gas content.

In one aspect, the method may further include removing at least some of the second gas stream, for example, through at least one passage. For example, the at least one passage for removing at least some of the second gas stream may be a gas diffusion layer; a gas-permeable dual electrode; and/or the second electrolyte, for instance, via "back diffusion."

In one aspect, the method may further include introducing at least some hydrogen gas to the second gas stream, for example, through at least one passage. For example, the at least one passage for introducing at least some hydrogen gas may be through a gas diffusion layer; through a gas-permeable dual electrode; and/or through the second electrolyte.

A still further embodiment of the invention is a water electrolyzer cell comprising or including: a first membrane electrode assembly (MEA) comprising: a first anode positioned to contact a first $H_2O$-containing fluid stream, the first anode containing a catalyst adapted to oxidize at least some of the $H_2O$ in the first $H_2O$-containing fluid stream to produce oxygen gas, hydrogen ions, and electrons; a first electrolyte positioned and adapted to receive and transfer at least some of the hydrogen ions produced by the first anode; and a first cathode positioned to receive at least some of the hydrogen ions transferred by the first electrolyte, the first cathode containing a catalyst adapted to reduce the at least some of the hydrogen ions to produce a second fluid stream containing hydrogen gas; a second MEA comprising: a second anode positioned to receive the second fluid stream containing hydrogen gas from the first cathode of the first MEA, the second anode containing a catalyst adapted to oxidize at least some of the hydrogen gas to produce hydrogen ions and electrons; a second electrolyte positioned and adapted to receive and transfer at least some of the hydrogen ions produced by the second anode; and a second cathode positioned to receive at least some of the hydrogen ions transferred by the second electrolyte of the second MEA, the second cathode containing a catalyst adapted to reduce the at least some of the hydrogen ions to produce a third fluid stream containing hydrogen gas.

In one aspect, the electrolyzer cell may further include at least one passage between the first electrolyte and the second electrolyte for discharging at least some of the second fluid stream. For example, the passage for discharging the second fluid stream may be located between the first cathode and the second anode. For instance, the at least one passage located between the first cathode and the second anode may be voids between mating surfaces of the first cathode and the second anode; and/or a gas-permeable layer (GDL) and/or flow field insert, between the first cathode and the second anode.

In another aspect, the water electrolyzer cell may further include at least one passage between the first electrolyte and the second electrolyte for introducing hydrogen-containing gas to the second gas stream. For example, the passage for introducing hydrogen gas may be voids between mating surfaces of the first cathode and the second anode; and/or a GDL and/or flow field insert located between the first cathode and the second anode.

Another embodiment of the invention is a method for electrolyzing water, the method comprising or including: introducing a first $H_2O$-containing fluid stream to a first anode containing a catalyst; in the first anode, catalytically oxidizing at least some of the $H_2O$ in the first $H_2O$-containing fluid stream to produce oxygen gas, hydrogen ions, and electrons; transferring at least some of the hydrogen ions through a first electrolyte to a first cathode containing a catalyst; in the first cathode, catalytically reducing the at least some of the hydrogen ions transferred through the first electrolyte to produce a second fluid stream having hydrogen gas; introducing the second fluid stream having the hydrogen gas to a second anode having a catalyst; in the second anode, catalytically oxidizing at least some of the hydrogen gas in the second fluid stream to produce hydrogen ions and electrons; transferring at least some of the hydrogen ions produced at the second anode through a second electrolyte to a second cathode; and in the second cathode, catalytically reducing the at least some of the hydrogen ions transferred through the second electrolyte to produce a third fluid stream having hydrogen gas. According to aspects of the invention, the "fluid streams" may be a liquid stream, a gas stream, and/or a liquid and gas stream.

In one aspect, the method my further include removing at least some of the second fluid stream to produce a modified fluid stream having a non-hydrogen gas partial pressure lower than a partial pressure of the non-hydrogen gas in the second fluid stream. The method may further include introducing the modified fluid stream to the second anode.

In another aspect, the method may further include introducing some hydrogen gas to the second fluid stream, for example, the hydrogen gas introduced may replenish at least some of the hydrogen gas removed from the second fluid stream.

A further embodiment of the invention is a water electrolyzer cell comprising or including: a membrane electrode assembly (MEA) comprising: an anode positioned to contact a first $H_2O$-containing fluid stream, the anode containing a catalyst adapted to oxidize at least some of the $H_2O$ in the first $H_2O$-containing fluid stream to produce oxygen gas, hydrogen ions, and electrons; a first electrolyte positioned and adapted to receive and transfer at least some of the hydrogen ions produced by the anode; a dual electrode positioned to receive at least some of the hydrogen ions transferred by the first electrolyte, the dual cathode containing a catalyst adapted to reduce the at least some of the hydrogen ions to produce a second gas stream having a second hydrogen gas content and to oxidize at least some of second hydrogen gas content in the second gas stream to produce hydrogen ions and electrons; a second electrolyte positioned and adapted to receive and transfer at least some of the hydrogen ions received from the dual electrode; and a cathode positioned to receive at least some of the hydrogen ions transferred by the second electrolyte of the second MEA, the cathode containing a catalyst adapted to reduce the at least some of the hydrogen ions to produce a third fluid stream containing hydrogen gas.

Another embodiment of the invention is a method for electrolyzing water, the method comprising or including: introducing a first $H_2O$-containing fluid stream to an anode containing a catalyst; in the anode, catalytically oxidizing at least some of the $H_2O$ in the first $H_2O$-containing fluid stream to produce oxygen gas, hydrogen ions, and electrons; transferring at least some of the hydrogen ions produced in the anode through a first electrolyte to a dual electrode; in the dual electrode, catalytically reducing the at least some of the hydrogen ions transferred through the first electrolyte to produce a second fluid stream having a second hydrogen gas content, and catalytically oxidizing at least some of second hydrogen gas content in the second gas stream to produce hydrogen ions and electrons; transferring at least some of the hydrogen ions produced in the dual electrode through a second electrolyte to a cathode; and in the cathode, catalytically reducing the at least some of the hydrogen ions transferred through the second electrolyte to produce a third fluid stream having hydrogen gas.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

Figure 1:
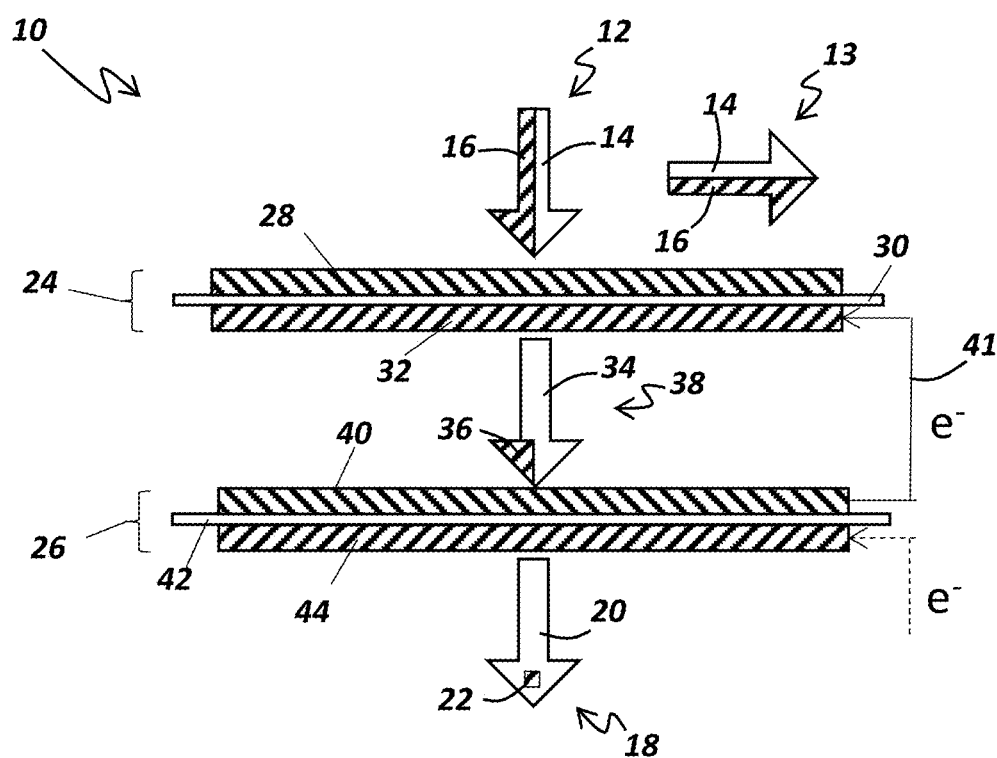
FIG. 1 is a schematic illustration of a hydrogen gas purifier cell according to one aspect of the invention.

FIG. 1 is a schematic illustration of a hydrogen gas purifier cell 10 according to one aspect of the invention. According to this aspect, purifier cell 10 is positioned and adapted to receive a feed or first gas stream 12 having at least some hydrogen gas content 14 (that is, diatomic hydrogen gas, $H_2$) and at least some non-hydrogen gases 16 and produce a reduced non-hydrogen-gas-content gas stream 18, that is, a gas stream 18 having a purer hydrogen gas content. The non-hydrogen gases 16 may typically contain nitrogen ($N_2$), argon (Ar), carbon monoxide (CO), methane ($CH_4$), oxygen ($O_2$), and/or carbon dioxide ($CO_2$), among other gases. According to one aspect of the invention, the expression "non-hydrogen gases" may refer to gases that are not diatomic hydrogen gas, $H_2$. The reduced non-hydrogen-gas-content gas stream 18 may be referred to as a discharge gas stream 18 or a third gas stream 18. Third gas stream 18 may typically include an enhanced hydrogen gas content 20 and a reduced non-hydrogen gas content 22, for example, a higher purity hydrogen gas stream, for instance, having a non-hydrogen content of at most 100 ppm, on a dry basis. In other aspects of the invention, the non-hydrogen content 22 of gas stream 18 may be at most 20 ppm, or at most 10 ppm; or at most 5 ppm, or at most 2 ppm, or at most 1 ppm. In addition to reducing the content of the non-hydrogen gases in gas stream 18, in aspects of the invention, gas stream 18 may typically have increased hydrogen gas content 20, for example, by volume percent, and an increased hydrogen gas pressure, for example, a pressure greater than the pressure of the feed gas stream 12. In one aspect, the pressure of gas stream 18 may be less than the pressure gas stream 12. Since the desired function of purifier cell 10 is to reduce or substantially eliminate the content of non-hydrogen gases 16, the non-hydrogen gases 16 may be referred to as "impurity gases" 16 or "first impurity gases" 16.

As shown schematically in FIG. 1, hydrogen gas purifier cell 10 typically comprises a multilayer structure having components, for example, anodes and cathodes having thin planar or thin laminar construction, where the structures shown in FIG. 1 may comprise a side elevation view or a trans-axial cross-sectional view of purifier cell 10 that is not drawn to scale, but is drawn to facilitate disclosure of the invention.

According to aspects of the invention, to provide the desired increased hydrogen gas content 20, and typically increased hydrogen gas pressure, purifier cell 10 typically includes a first membrane electrode assembly (MEA) 24 and at least one second MEA 26. The first MEA 24 includes a first electrode 28, specifically a first "anode" 28, as referred to in the art. Anode 28, any anode disclosed herein, may typically be gas-permeable, specifically, hydrogen-gas permeable, where at least some of the hydrogen gas content 14 and at least some of the non-hydrogen gas content 16 in first gas stream 12 may pass through anode 28, for example, in an axial direction as indicated by the arrow of first gas stream 12. In addition, anode 28, and any anode or cathode disclosed herein, includes at least some catalyst, for example, at least some platinum group metal-containing catalyst, capable of enhancing the oxidation of hydrogen to hydrogen ions (H+), for instance, a platinum-containing catalyst, though in some aspects, a non-platinum group metal-containing catalyst may be used for anode 28 and any anodes or cathodes disclosed herein. As known in the art, a platinum group metal-containing catalyst may be a catalyst containing at least some nickel (Ni), at least some palladium (Pa), and/or at least some platinum (Pt).

The first anode 28 is positioned to contact the first gas stream 12 having the first hydrogen gas content 14 and the first impurity gas content 16. The relative content of the first hydrogen gas 14 and the first impurity gas content 16 of first gas stream 12 is illustrated schematically in FIG. 1, and in other figures, by the partial shading of the arrow identified as first gas stream 12. This partial shading of gas stream arrow 12 (and of gas stream arrows 38 and 18 in FIG. 1) are for illustration only, and do not represent actual relative gas contents of these gas streams according to aspects of the invention.

In one aspect, in order to enhance the distribution of first gas stream 12 about the surface of anode 28, an electrically-conductive gas diffusion layer (GDL), not shown in FIG. 1, may be positioned between first gas stream 12 and anode 28, for example, the GDL may be applied over the surface of anode 28 contacted by first gas stream 12. In one aspect, the GDL used for the cell 10, or the GDL layer used in any aspect disclosed herein, may be a carbon fiber-type GDL, for example, one provided by SGL Carbon GmBH, or its equivalent. In another aspect, a gas-distribution or flow field insert (as disclosed herein) with or without a GDL, may be positioned over anode 102 to promote or enhance the distribution of the first gas stream 12 across the surface of anode 28.

According to aspects of the invention, the catalyst contained in first anode 28 promotes or enhances the oxidation of at least the hydrogen gas ($H_2$) content 14 introduced to anode 28 to yield or produce hydrogen ions (H+) and electrons (e⁻) pursuant to Equation 1, as known in the art.

$$H_2 => 2H^+ + 2e^-. \qquad \text{Equation 1}$$

Due to the permeability of anode 28, hydrogen gas ($H_2$) passes into anode 28, and, due to the electrical conductivity of anode 28, electrons (e⁻) are conducted away from anode 28, and, according to aspects of the invention, hydrogen ions (H+) are introduced to electrolyte 30. As known in the art, hydrogen ions (H+) are protons. However, it is recognized in the art that at least some undesirable, non-hydrogen gas 16 also passes through anode 28.

As is typical in the art, at least some of input or first gas stream 12 may not oxidize at anode 28, but be removed as gas stream 13, for example, an "exhaust gas stream." Typically, exhaust stream 13, typically having less hydrogen gas content due to the oxidation of hydrogen gas that occurs in first anode 28, may be captured and directed, for example, via channels, manifolds, and ports, to further processing or disposed of as needed.

Electrolyte 30, or a first electrolyte 30, is positioned and adapted to receive and transfer at least some of the hydrogen ions ($H^+$). Due to the close proximity of anode 28 to electrolyte 30, hydrogen ions ($H^+$) and non-hydrogen gas that diffused through anode 28 are passed from anode 28 to electrolyte 30. First electrolyte 30 comprises a barrier between the first anode 28 and the electrode 32. First electrolyte 30 may comprise any material or substance capable of transmitting the hydrogen ions ($H^+$), for example, selectively transmitting hydrogen ions (H+), that is, protons, from first anode 28 to electrode 32. That is, in one aspect, electrolyte 30, and any electrolyte disclosed herein, may be referred to as a "proton-conductive material," while substantially preventing the flow of gas and electrons. First electrolyte 30, and any electrolyte disclosed herein, may typically be acidic, for example, an acidic polymer containing a perfluorosulfonic acid (PFSA). In one aspect, electrolyte 30, and any electrolyte disclosed herein, may be a membrane marketed under the trademark Nafion™ by The Chemours Company of Wilmington, Delaware, or its equivalent. In other aspects, electrolyte 30, and any electrolyte disclosed herein, may contain one or more of the following acids: phosphoric acid [$H_3PO_4$], sulfuric acid [$H_2SO_4$], or any other hydrogen ion ($H^+$) conducting acid. In one aspect, first electrolyte 30 may comprise a proton exchange membrane (PEM), as known in the art.

As known in the art, the passage of gas though electrolyte 30, and through any electrolyte disclosed herein, is driven by the partial pressure gradient of the gas across the electrolyte, for example, from one side of electrolyte 30 to the other, opposite side of electrolyte 30. Thus, any undesirable non-hydrogen gas with sufficient partial pressure gradient may also diffuse through electrolyte 30, and through any electrolyte disclosed herein. In addition to the pressure gradient across an electrolyte, imperfections in the electrolyte, for example, small holes or voids in the electrolyte, may also undesirably allow gas to flow through an electrolyte, like electrolyte 30.

Electrode 32, which may be referred to as "cathode" 32, as known in the art, or a first cathode 32, is positioned to receive at least some of the hydrogen ions ($H^+$) transferred by the first electrolyte 30. Similar to the first anode 28, first cathode 32, and any cathode disclosed herein, typically contains a catalyst, for example, a platinum group metal-containing catalyst, adapted to enhance the reaction (that is, reduction) of at least some of the hydrogen ions ($H^+$) that pass through first electrolyte 30 by reacting with at least some electrons ($e^-$) pursuant to Equation 2, as known in the art.

$$2H^+ + 2e^- => H_2. \quad \text{Equation 2}$$

The resulting, or "evolved," hydrogen gas ($H_2$) 34, or a second hydrogen gas content 34, and any non-hydrogen gases 36, or a second impurity gas content 36, transferred though first cathode 32 are indicated as gas stream 38 in FIG. 1, or a second gas stream 38.

In one aspect, in order to enhance the distribution of the hydrogen gas about the surface of first cathode 32, a gas diffusion layer (GDL) and/or a flow field insert, not shown in FIG. 1, may be positioned between first electrolyte 30 and first cathode 32, for example, the GDL and/or flow field insert may be applied over the surface of first cathode 32.

According to aspects of the invention, the second hydrogen gas content 34 is greater than the first hydrogen gas content 14; and the second impurity gas content 36 is less than the first impurity gas content 16.

As shown in FIG. 1, according to aspects of the invention, second gas stream 38 having second hydrogen gas content 34 and second impurity gas content 36 may then be introduced to second MEA 26, specifically, to electrode 40, or second anode 40, of second MEA 26. In the schematic diagram of the purifier cell 10 shown in FIG. 1, first MEA 24 is shown spaced from second MEA 26 to facilitate illustration and disclosure of the invention. However, according to aspects of the invention, the spacing between first MEA 24 and second MEA 26 may be minimal, for example, where the surface of first cathode 32 may abut or contact the surface of second anode 40. However, in one aspect, at least some spacing, for example, 0.1 millimeters [mm] to 0.5 mm, may be present between the surface of first cathode 32 and the surface of second anode 40.

According to aspects of the invention, and contrary to the existing art, second gas stream 38 having second hydrogen gas content 34 and second impurity gas content 36 may then be introduced to second MEA 26 without removing or extracting second gas stream 38 from purifier cell 10. In other words, though some portion of gas stream 38 may undesirably "escape" from purifier cell 10, according to one aspect of the invention, substantially all of gas stream 38 produced at first cathode 32 or diffused through cathode 32 is received by second anode 40. For example, in one aspect, second gas stream 38 may be allowed to pass from first cathode 32 of MEA 24 to second anode 40 of MEA 26 without any intervening handling or treatment, for instance, without passing outside of cell 10. In one aspect, the evolved hydrogen gas ($H_2$) formed in first cathode 32 may substantially be immediately oxidized to hydrogen ions ($H^+$) at second anode 40. In one aspect, second gas stream 38 may be allowed to pass directly from first cathode 32 of MEA 24 to second anode 40 of MEA 26 of purifier cell 10, for instance, without passing outside of cell 10 before reaching second cathode 40.

The second anode 40 is positioned to be contacted by the second gas stream 38 having the second hydrogen gas content 34 and the second impurity gas content 36. Second anode 40 of second MEA 26 may be similar to, if not identical to, first anode 28 of MEA 24. Second anode 40 may be hydrogen-gas permeable, where at least some of the hydrogen gas content 34 and at least some of the non-hydrogen gas content 36 in second gas stream 38 may pass through second anode 40, for example, in an axial direction, as indicated by the arrow of second gas stream 38. In addition, second anode 40 includes at least some catalyst, for example, at least some platinum group metal-containing catalyst, capable of enhancing the oxidation of hydrogen gas to hydrogen ions ($H^+$) and electrons ($e^-$), as indicated by Equation 1.

In one aspect, in order to enhance the distribution of second gas stream 38 about the surface of second anode 40, a gas diffusion layer or GDL and/or flow field insert, not shown in FIG. 1, may be positioned between the first cathode 32 and second anode 40, for example, the GDL and/or flow field insert may be applied over the surface of second anode 40 contacted by second gas stream 38.

According to aspects of the invention, the catalyst contained in second anode 40 promotes or enhances the oxidation of the hydrogen gas content 34 introduced to second anode 40 to yield or produce hydrogen ions (H$^+$) and electrons (e$^-$) pursuant to Equation 1, above. In one aspect, the electrons (e$^-$) generated in second anode 40 may be directed back to first cathode 32, as indicated by arrow 41 in FIG. 1, to supply at least some of the electrons (e$^-$) used to reduce the hydrogen ions (H$^+$) to hydrogen (H$_2$) at first cathode 32, pursuant to Equation 2. Due to the permeability of second anode 40, some impurity gases and any unoxidized hydrogen (H$_2$) may pass through second anode 40, and, according to aspects of the invention, are introduced to or come in contact with an electrolyte 42.

Electrolyte 42 of MEA 26, or a second electrolyte 42, is positioned and adapted to receive and transfer at least some of the hydrogen ions (H$^+$) received from the second anode 40. Second electrolyte 42 comprises a gas barrier between the second anode 40 and the electrode 44. Second electrolyte 42 may be similar to, if not substantially identical to, first electrolyte 30, and comprise any material or substance capable of transmitting the hydrogen ions (H+), for example, selectively transmitting hydrogen ions (H+), that is, protons, from second anode 40 to an electrode 44. Again, as noted with respect to electrolyte 30, in one aspect, electrolyte 42 may be referred to as a "proton-conductive material." Second electrolyte 42 may typically be acidic, for example, containing one or more of the acids identified above with respect to first electrolyte 30. However, in one aspect, second electrolyte 42 may comprise a PEM, as known in the art.

Electrode 44, which may be referred to as "cathode" 44, as known in the art, or second cathode 44, is positioned to receive at least some of the hydrogen ions (H$^+$) transferred by second electrolyte 42. Similar to the second anode 40, second cathode 44 typically contains a catalyst, for example, a platinum group metal-containing catalyst, adapted to enhance the reduction of at least some of the hydrogen ions (H$^+$) using at least some electrons (e$^-$) pursuant to Equation 2, above. The resulting, or "evolved," hydrogen gas (H$_2$) content 20, or a third hydrogen gas content 20, and any non-hydrogen gases 22, or a second impurity gas content 22, transferred though electrolyte 30 are indicated as gas stream 18 in FIG. 1, or discharge gas stream 18 or third gas stream 18.

In one aspect, in order to enhance the distribution of the hydrogen ions (H$^+$) about the surface of second cathode 44, a gas diffusion layer (GDL) and/or flow field insert, not shown in FIG. 1, may be positioned between second electrolyte 42 and second cathode 44, for example, the GDL and/or flow field insert may be applied over the surface of second cathode 44.

According to aspects of the invention, the third hydrogen gas content 20 of third gas stream 18 is greater than the first hydrogen gas content 14 and the second hydrogen gas content 34; and the third impurity gas content 22 is less than the first impurity gas content 16 and the second impurity gas content 36. However, typically, the third gas stream 18 may have a purity, on a "dry basis," in percent that is greater than the purity of the first gas stream 12. For example, the third hydrogen gas content 20 in third gas stream 18 may be at least 10 percent greater, by volume, than the first hydrogen gas content 14 in first gas stream 12. In one aspect, the third hydrogen gas content 20 may be from 20 percent to 30 percent greater, by volume, than the first hydrogen gas content 14. Also, in one aspect, the third gas stream 18 may be at least 1,000 times purer in hydrogen, by volume, than the first gas stream 12. In one aspect, the third gas stream 18 may be from 10,000 times to 10,000,000 [10 million] times purer in hydrogen, by volume, than the first gas stream 12. However, typically, the third gas stream 18 may be from 100,000 times to 2,000,000 [2 million] times purer in hydrogen content, by volume, than the first gas stream 12. For example, in one aspect, the purity of the third gas stream 18 may be at least 99.99 percent hydrogen, by volume, or at least 99.999 (five 9s) percent, by volume, or 99.9999 (six 9s) percent by volume. According to another aspect of the invention, the purity of the third gas stream 18 may be expressed on a basis of the third impurity gas content 22. For example, in one aspect the third impurity gas content 22 may be at most 100 ppm of impurity gas. In other aspects of the invention, the third impurity gas content 22 produced may be at most 20 ppm, or at most 10 ppm, at most 5 ppm, or at most 2 ppm, or at most 1 ppm. In other aspects of the invention, the third impurity gas content 22 of the hydrogen gas 18 produced may be at most 750 ppb (that is, at most 0.750 ppm), or at most 500 ppb, or at most 200 ppb; or even at most 100 ppb. As known in the art, these impurity contents of the hydrogen gas produced are typically "on a dry basis."

According to aspects of the invention, in purifier cell 10, by passing the second gas stream 38 having hydrogen gas content 34 from first cathode 32 of MEA 24 to second anode 40 of second MEA 26 can not only provide a more compact purifier, but also can provide a more efficient device and providing a purer hydrogen gas content 22 than the prior art. Among other things, the passing of the second gas stream 38 from first cathode 32 to second anode 40, for example, directly, avoids the recognized addition of components, the losses in efficiency, and loss in hydrogen gas content that characterize the performance of prior art hydrogen gas purifiers.

In addition, according to aspects of the invention, the resulting gas stream, that is, third gas stream 18 having a higher hydrogen gas content 20 may typically be provided at a higher pressure than the pressure of the feed or first gas stream 12. For example, according to aspects of the invention, where first gas stream 12 may have a pressure of about 1 pound per square inch-gauge [psig], third gas stream 18 may have a pressure of at least 150 psig. In one aspect, the pressure of third gas stream 18 may be at least 120 psig, or at least 200 psig, or even at least 10,000 [10 thousand] psig. In other aspects pf the invention, the pressure of third gas stream 18 may not be greater than the pressure of the feed or first gas stream 12; in one aspect, the pressure of the third gas stream 18 may less than the pressure of the first gas stream 12.

Figure 2:
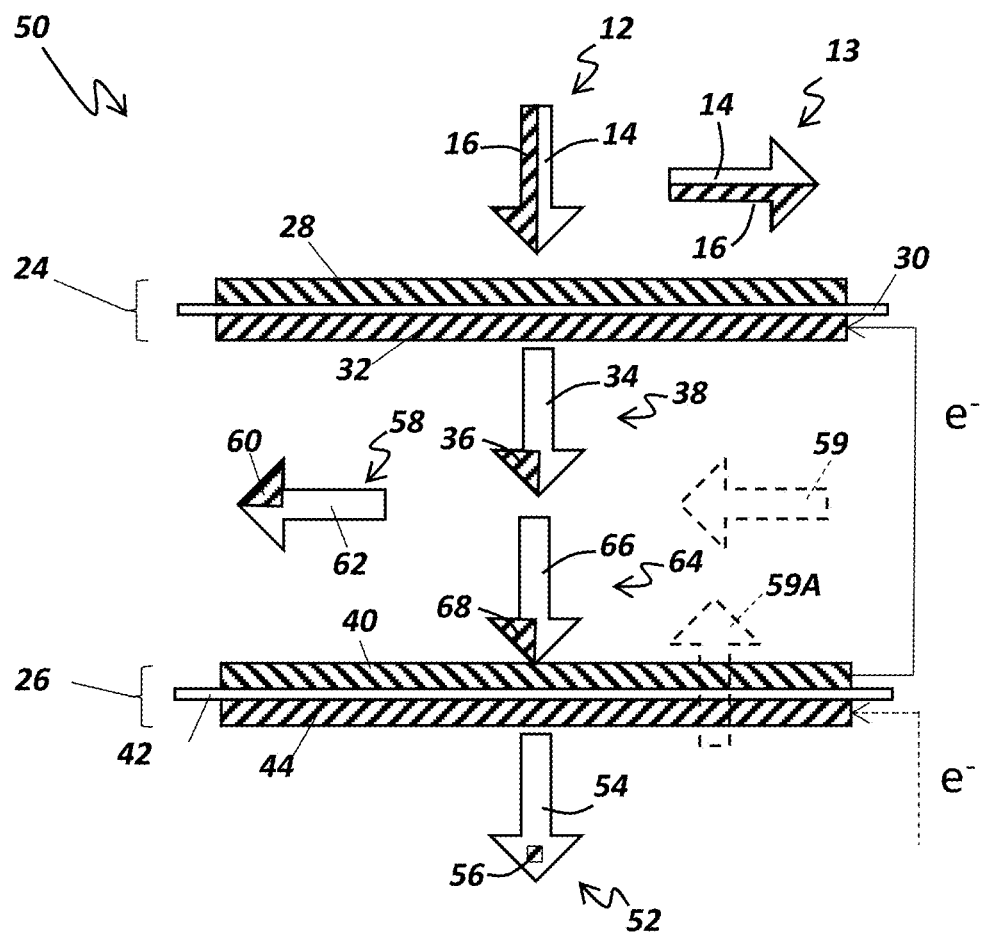
FIG. 2 is a schematic illustration of a hydrogen gas purifier cell according to another aspect of the invention.

FIG. 2 is a schematic illustration of a hydrogen gas purifier cell 50 according to another aspect of the invention. According to this aspect, purifier cell 50 may have many of the features of purifier cell 10; however, purifier cell 50 further includes at least one gas discharge or release between the MEAs. According to this aspect, testing has shown that that discharging or allowing at least some of the second gas stream (38 in FIG. 2) to escape from purifier cell 50 yields a higher hydrogen gas content, that is, compared with a purifier not allowing the removal of at least some of the second gas stream between MEAs. It is believed that this venting of at least some of the second gas stream reduces the partial pressure of the non-hydrogen gas between the MEAs and thus reduces the partial pressure gradient driving force of the undesirable non-hydrogen gas through the second MEA. In a further aspect, since some of the desirable hydrogen gas will be lost when removing some of the second gas stream, at least some hydrogen gas may be introduced between the MEAs to function as a "make-up" hydrogen gas for the hydrogen gas possibly lost with the removal of some of the second gas stream.

As shown in FIG. 2, in a manner similar to purifier cell 10, purifier cell 50 is positioned and adapted to receive a feed or first gas stream 12, similar or identical to first gas stream 12 shown in FIG. 1, and at least some non-hydrogen gases 16 and produce an increased hydrogen gas content and a reduced non-hydrogen-gas-content gas stream 52. The gas stream 52 may be referred to a discharge gas stream 52 or a third gas stream 52. Similar to purifier cell 10, third gas stream 52 may typically include an enhanced hydrogen gas content 54 and a reduced non-hydrogen gas content 56. As shown schematically in FIG. 2, similar to purifier cell 10, hydrogen gas purifier cell 50 typically comprises a multi-layer structure having components, for example, anodes and cathodes having thin planar or thin laminar construction, where the structures shown in FIG. 2 may comprise a side elevation view or a trans-axial cross-sectional view of purifier cell 50 that is not drawn to scale, but is drawn to facilitate disclosure of the invention.

In one aspect, hydrogen gas purifier cell 50 shown in FIG. 2, may have substantially the same first MEA 24 as in purifier cell 10, that is, having a first anode 28, a first electrolyte 30, and a first cathode 32 to at least partially purify first gas stream 12 and yield a second gas stream 38 having a hydrogen gas content 34 and a non-hydrogen gas content 36 in a manner substantially identical to purifier cell 10 shown in FIG. 1. As is typical in the art, at least some of input or first gas stream 12 may not diffuse through anode 28, but be removed as gas stream 13, for example, an "exhaust gas stream." In addition, hydrogen gas purifier cell 50 may have substantially the same second MEA 26 having a second anode 40, a second electrolyte 42, and a second cathode 44 to at least partially purify gas stream 38 to yield a third gas stream 52 having a hydrogen gas content 54 and a non-hydrogen gas content 56. However, according to the aspect of the invention shown in FIG. 2, hydrogen gas purifier cell 50 includes at least one discharge gas stream or displaced gas stream 58 having a non-hydrogen gas content 60 and a hydrogen gas content 62. It is recognized that the non-hydrogen gas content 60 and the hydrogen gas content 62 of discharge gas stream 58 may be substantially the same as the non-hydrogen gas content 36 and the hydrogen gas content 34 of second gas stream 38.

In one aspect, in order to enhance the distribution of the gas streams about the electrode surfaces, one or more gas diffusion layers (GDL) and/or flow field insert, not shown in FIG. 2, may be positioned within cell 50. For example, cell 50 may include a GDL and/or flow field insert associated with first anode 28, first cathode 32, second anode 40, and/or second cathode 44.

According to this aspect, after first gas stream 12 is processed by first MEA 24 to produce second gas stream 38 having hydrogen gas content 34 and non-hydrogen gas content 36, at least some of the gas stream 38 is removed via gas stream 58. The removal of gas stream 58 from gas stream 38 yields a modified or intermediate gas stream 64 having a hydrogen gas content 66 and a non-hydrogen gas content 68. It is recognized that the non-hydrogen gas content 68 and the hydrogen gas content 66 of modified gas stream 64 may be substantially the same as the non-hydrogen gas content 36 and the hydrogen gas content 34 of second gas stream 38. According to aspects of the invention, removal of gas stream 58 reduces partial pressure of non-hydrogen gas content 68 in modified gas stream 64 and this reduction in partial pressure reduces the partial pressure gradient across the second MEA 26 of the non-hydrogen gas content 58 which reduces the passage of the non-hydrogen gas content 68 through second MEA 26 to third gas stream 52. Accordingly, according to aspects of the invention, the non-hydrogen gas content 56 of third gas stream 52 is reduced.

The removal of gas stream 58 with non-hydrogen content 60 may be practiced by various means. In one aspect, gas stream 58 may be removed by simply venting at least some of second gas stream 38, for example, venting through the inherent spacing between first MEA 24 and second MEA 26, for instance, via the inherent spaces or voids between the surface of first cathode 32 and second anode 40. In another aspect, gas stream 58 may be removed by providing paths, channels, or grooves, for example, radial or transverse channels or grooves, in the mating surface of first cathode 32, in the mating surface of second anode 40, or in both the mating surface of first cathode 32 and in the mating surface of second anode 40. In another aspect, gas stream 58 may be removed through a GDL and/or a flow field insert positioned between the mating surface of first cathode 32 and the mating surface of second anode 40. As known in the art, a GDL is typically a porous material, such as, carbon paper, through which gas stream 58 may pass. In another aspect, gas stream 58 may be removed by providing one or more spacers between the mating surface of first cathode 32 and the mating surface of second anode 40 to provide a pathway for gas stream 58. In one aspect, a source of vacuum may be introduced to draw out at least some of the second gas stream 38 via gas stream 58.

According to another aspect of the invention, after first gas stream 12 is processed by first MEA 24 to produce second gas stream 38, having hydrogen gas content 34 and non-hydrogen gas content 36, at least some hydrogen gas may be introduced to gas stream 38. As shown in FIG. 2, in one aspect, hydrogen gas may be introduced to second gas stream 38 via gas stream 59 (shown in phantom in FIG. 2) to replace the hydrogen gas 62 lost from second gas stream 38 via gas stream 58 and produce modified gas stream 64. Though in one aspect, gas stream 38 may be highly pure hydrogen gas, for example, having a purity to at least greater than the hydrogen content 14 of first gas stream 12; in other aspects, gas stream 59 may be a hydrogen-gas containing stream having at least some hydrogen gas content, but may have a non-hydrogen gas content.

The introduction of hydrogen-containing gas stream 59, for example, a "make-up gas stream," may be practiced with or without the removal of gas stream 58. The introduction of gas stream 59 to gas stream 38 may be practiced in any one or more convenient manner, for example, by introducing the hydrogen-gas containing stream 59 through the gas-permeable electrolyte 42, for example, driven by a hydrogen gas partial pressure gradient, or though the gas-permeable first cathode 32, through a gas permeable GDL and/or flow field insert, or through channels in first cathode 32, channels in second anode 40 or through channels in both first cathode 32 and in second anode 40. Any channels that may be provided for hydrogen-gas containing stream 59 may be located in one or both of the opposing surfaces of first cathode 32 and second anode 40, that is, the surfaces the space occupied by second gas stream 38. In one aspect, the make-up hydrogen gas stream 59 may comprise at least some of the third gas stream 52 having a third hydrogen content 54. For example, at least some of the third gas stream 52 may be introduced to the second gas stream 38 by diffusion through the second electrolyte 42, as indicated in phantom by gas stream 59A in FIG. 2. This diffusion through the second electrolyte 42 may be referred to as "back diffusion" of at least some of the third gas stream 52 having the third hydrogen content 54 through the second electrolyte 42 to provide at least some of the make-up gas stream 59 to the second gas stream 38 or to the modified gas stream 64. The make-up gas stream 59 may be provided any one or more of these mechanisms.

According to aspects of the invention, the third hydrogen gas content 54 of third gas stream 52 is greater than the first hydrogen gas content 14 and the second hydrogen gas content 34; and the third impurity gas content 56 is less than the first impurity gas content 16 and the second impurity gas content 36. However, typically, the third gas stream 52 may have a purity, on a "dry basis," in percent that is greater than the purity of the first gas stream 12. For example, in one aspect, the purity of the third hydrogen gas content 54 may be at least 99.99 percent, by volume, or at least 99.999 (five 9s) percent, by volume, or 99.9999 (six 9s) percent, by volume. According to another aspect of the invention, the purity of the third gas stream 52 may be expressed on a basis of the third impurity gas content 56. For example, in one aspect, the third impurity gas content 56 may be at most 100 ppm of impurity gas. In other aspects of the invention, the third impurity gas content 56 produced may be at most 20 ppm, or at most 10 ppm, or at most 5 ppm, or at most 2 ppm, or at most 1 ppm. In other aspects of the invention, the third impurity gas content 56 of the hydrogen gas produced may be at most 750 ppb (that is, at most 0.750 ppm); or at most 500 ppb; or at most 200 ppb; or even at most 100 ppb. As known in the art, these impurity contents of the hydrogen gas produced are typically "on a dry basis."

Figure 3:
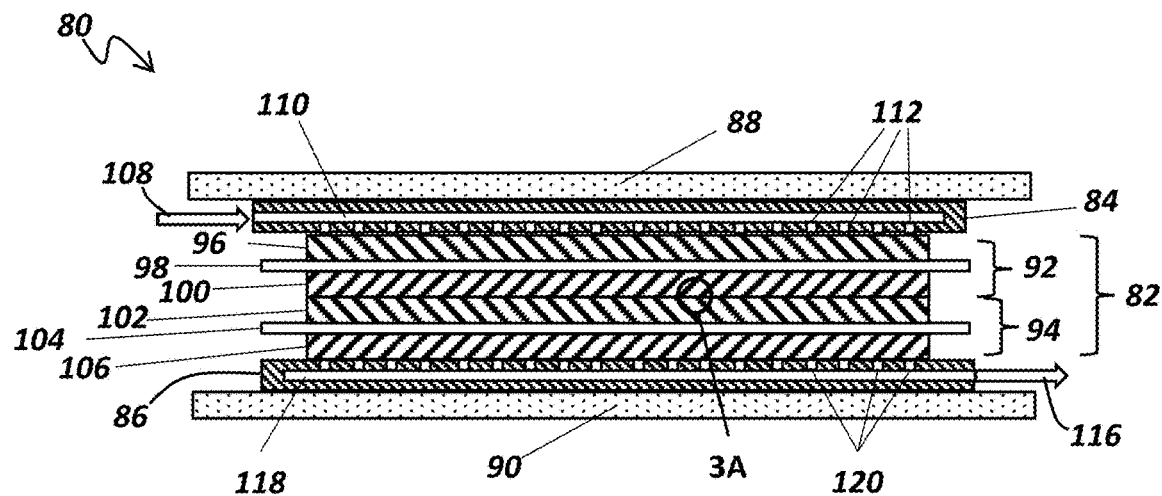
FIG. 3 is a schematic elevation view of a hydrogen purifier stack assembly having the hydrogen gas purifier cell shown in FIG. 1 or FIG. 2 according to aspects of the invention.

FIG. 3 is a schematic elevation view of a hydrogen purifier stack assembly 80 having a hydrogen gas purifier cell 82, for example, hydrogen gas purifier cell 10 or cell 50 disclosed herein, positioned between opposing electrically conducive, but gas impermeable layers or plates 84 and 86 and electrically conductive layers or bus bars 88 and 90 according to an aspect of the invention. Electrically conductive, but gas impermeable layers or plates 84 and 86 may be referred to as "bi-polar plates" as known in the art, since plates 84 and 86 may typically contain passages or channels adapted to introduce or remove gases from cell 82. Electrically conductive layers or bus bars 88 and 90 may also be referred as "current collectors." As shown, in one aspect, cell 82 may include at least two MEAs, a first MEA 92 and at least a second MEA 94. However, it is envisioned that, according to aspects of the invention, cell 82 may include three or more MEAs 92, 94; or 5 or more MEAs 92, 94, for example, positioned between bus bars 88 and 90. In one aspect, at least 10 MEAs 92, 94 may be positioned between bus bars 88 and 90.

In one aspect, hydrogen gas purifier cell 82 may be referred to as a "double membrane electrode assembly" or "DMEA." First MEA 92 includes a first anode 96, a first electrolyte 98, and a first cathode 90. First anode 96 may be similar, if not identical, to first anode 28 disclosed herein; first electrolyte 98 may be similar, if not identical, to first electrolyte 30 disclosed herein; and first cathode 90 may be similar, if not identical, to first cathode 32 disclosed herein. Second MEA 94 includes a second anode 102, a second electrolyte 104, and a second cathode 106. Second anode 102 may be similar, if not identical, to second anode 40 disclosed herein; second electrolyte 104 may be similar, if not identical, to second electrolyte 42 disclosed herein; and second cathode 106 may be similar, if not identical, to second cathode 44 disclosed herein.

Electrically conducive, gas-impermeable layers or plates (or bi-polar plates) 84 and 86 may typically be fabricated from a corrosion resistant or non-oxidative material due to the electro-chemistry of cell 82. Though it is envisioned that any electrically-conductive, substantially gas-impermeable, and substantially corrosion-resistant material, for example, a metal, may be used in aspects of the invention for plates 84 and 86, typically, plates 84 and 86 may be made from a electrically-conductive, substantially gas-impermeable, and substantially corrosion resistant graphite-containing material. For example, plates 84 and 86 may be made from material containing graphite powder and a resin. In one aspect, bi-polar plates 84 and 86 may be made from a non-metallic material, for example, a plastic, into which electrically conductive inserts and/or particles have been placed to provide the desired conductivity.

In one aspect, it is envisioned that bi-polar plates 84 and 86 may include portions that are at least semi-permeable, for example, to allow for fluid permeability as needed for thermal management and/or water management.

According to an aspect of the invention, electrically conductive current collectors 88 and 90 may be relatively highly conductive, for example, relative to plates 84 and 86. In one aspect, current collectors 88 and 90 may be plated, for example, gold or silver plated to enhance conductivity. For example, current collectors 88 and 90 may comprise stainless steel plates, aluminum plates, or copper plates that may be plated with gold or silver.

According to aspects of the invention, as shown in FIG. 3, a first gas stream 108 containing hydrogen gas ($H_2$) and non-hydrogen gas, as disclosed herein, may be introduced to first anode 96 where at least some of the hydrogen gas ($H_2$) oxidizes to hydrogen ions ($H^+$) and electrons ($e^-$) pursuant to Equation 1. The first gas stream 108 may be introduced to first anode 96 by any conventional means, for example, via passages and/or channels in bi-polar 84. For example, as shown in FIG. 3, first gas stream 108 may be introduced to first anode 96 via a plurality of lateral passages 110 communicating with a plurality of longitudinal passages or channels 112 that discharge onto first anode 96. First anode 96 may include a GDL and/or flow field insert (not shown in FIG. 3), for example, a carbon-paper-type GDL, to enhance the distribution of first gas stream 108 across the surface of first anode 96.

Once introduced to anode 96, the reactions and fluid flows described with respect to FIGS. 1 and 2 are generated within MEAs 92 and 94; specifically, a second gas stream 114 (not shown in FIG. 3) from first cathode 100 and a third gas stream 116 from second cathode 106 are generated according to aspects of the invention. As disclosed herein, second anode 102 receives the second gas stream 114 (again, not shown in FIG. 3). In one aspect, second anode 102 may include or be accompanied by a GDL and/or flow field insert (not shown in FIG. 3), for example, a carbon-paper-type GDL, to enhance the distribution of the second gas stream 114 across the surface of second anode 102. Third gas stream 116 may be collected from second cathode 106 by conventional means. For example, as shown in FIG. 3, third gas stream 116 may be removed from third cathode 106, with or without passing through a gas-diffusion layer (not shown), via a plurality of lateral passages 118 communicating with a plurality of longitudinal passages or channels 120 in fluid communication with second cathode 106. The plurality of lateral passages 118 may comprise a plurality of substantially parallel passages or a plurality of serpentine passages in bi-polar plate 86. As known in the art, the parallel or serpentine passages in bi-polar plate 86 may be in fluid communication with one or more manifolds, for example, vertical or longitudinal manifolds, and the one or more manifolds may be in fluid communication with one or more ports for introducing, discharging, or re-directing gas streams.

According to aspects of the invention, third gas stream 116 may contain a larger content of hydrogen gas ($H_2$) and a lower non-hydrogen gas content than the first gas stream 108. For example, as disclosed herein, the non-hydrogen gas content of third gas stream 116 may have at most 100 ppm of non-hydrogen gas, or at most 20 ppm, or at most 10 ppm, or at most 5 ppm, or at most 2 ppm, or at most 1 ppm, or even at most 500 ppb, "on a dry basis." In addition, third gas stream 116 may typically have a higher pressure than the pressure first gas stream 108, though in other aspects, third gas stream 116 may have a lower pressure than the pressure first gas stream 108.

Figure 3A:
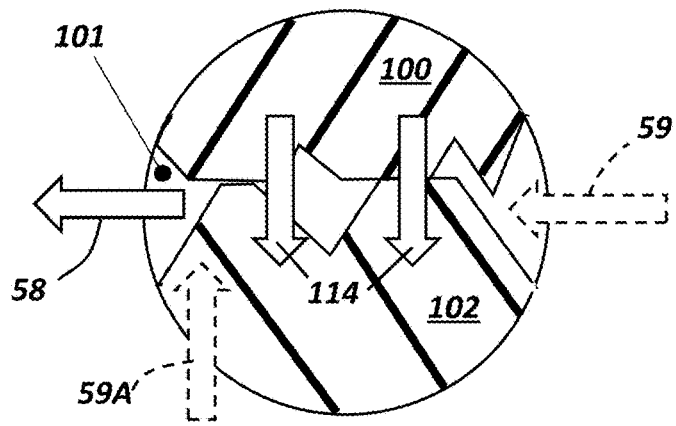
FIG. 3A is a detailed view of the hydrogen purifier stack assembly shown in FIG. 3 as identified by Detail 3A shown in FIG. 3.
Figure 3B:
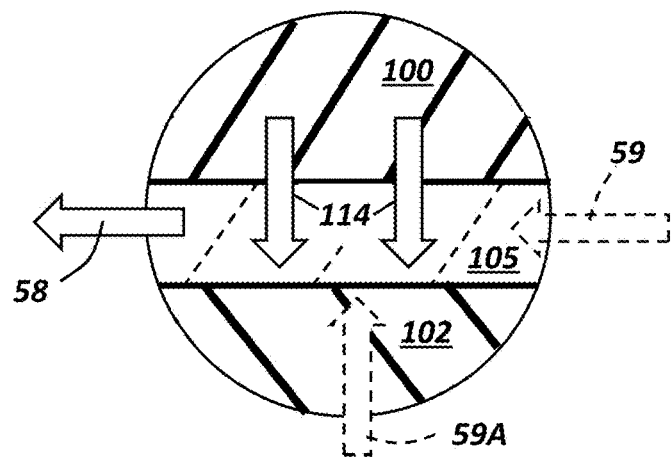
FIG. 3B is a detailed view similar to FIG. 3A according to another aspect of the invention.

A schematic detailed view of the interface between first cathode 100 and second anode 102 according to one aspect of the invention is shown FIG. 3A. FIG. 3A is a detailed view of a portion of hydrogen purifier stack assembly 80 shown in FIG. 3 as identified by Detail 3A shown in FIG. 3. As shown in FIG. 3A, second gas stream 114, having hydrogen gas content 34 (see FIGS. 1 and 2) and non-hydrogen gas content 36, exits first cathode 100 and enters spaces 101 between the mating surface of first cathode 100 and second anode 102. Spaces, voids, or interstitial spaces 101 are typically present between first cathode 100 and second anode 102 due to imperfections in the mating surfaces of first cathode 100 and second anode 102 and due to, among other things, fabrication imperfections and/or tolerances. It is believed that these spaces or voids 101 may be minute, but are typically present between the mating surfaces of first cathode 100 and second anode 102, and other mating electrodes disclosed herein, and can provide a path for gas streams, for example, the removal and/or introduction of gas streams. According to aspects of the invention, second gas stream 114 via direct contact or via spaces 101 typically contacts and enters second anode 102 where, according to aspects of the invention described herein, catalytic oxidation of the hydrogen gas content 34 in second gas stream 114 occurs. In one aspect, a GDL 105 may be positioned between first cathode 100 and second anode 102, as shown in FIG. 3B, to promote or enhance the distribution of the second gas stream 114 across the surface of second anode 102. In another aspect, a gas-distribution or flow field insert, with or without a GDL, may be positioned between first cathode 100 and second anode 102 (or between any electrodes disclosed herein), as indicated by GDL 105 in FIG. 3B, to promote or enhance the distribution of the second gas stream 114 across the surface of second anode 102. The flow field insert may be an electrically-conductive, porous or perforated plate, for example, a porous or perforated metallic plate, or a screen-like insert, for example, a metallic screen-like insert, positioned and adapted to provide at least some gas distribution about the surface of second anode 102. The flow field insert disclosed herein may also include channels or passages for permitting introduction or removal of gas streams from or to adjacent electrodes.

As disclosed herein, gas purifier cell 82 may comprise hydrogen gas purifier cell 10, disclosed and describe with respect to FIG. 1, or hydrogen gas purifier cell 50, disclosed and describe with respect to FIG. 2. The detailed views shown in FIGS. 3A and 3B also illustrate these aspects of the invention. Specifically, if gas purifier cell 82 in FIG. 3 comprises a purifier cell 10, as shown in FIG. 3A, substantially all of second gas stream 114 that leaves first cathode 100 passes, for example, directly passes, through direct contact or via spaces 101 to second anode 102 (with or without GDL 105 and/or flow field insert) for subsequent catalytic oxidation, as disclosed herein.

In aspects of the invention where gas purifier cell 82 in FIG. 3 comprises a purifier cell 50, as shown in FIGS. 3A and 3B, at least some of the second gas stream 114 that leaves first cathode 100 is removed as gas stream 58 (see FIG. 2). According to this aspect, removed gas stream 58 may contain at least some non-hydrogen gas, where, upon removal, the remaining modified gas stream has a lower partial pressure for the non-hydrogen gas. The lower partial pressure of the non-hydrogen gas is less prone to be transmitted through second electrolyte 104, and to output or third gas stream 116 (see FIG. 3). As shown in FIG. 3A, the removed or vented gas stream 58 may be passed from spaces 101 and/or, as shown in FIG. 3B, the removed or vented gas stream 58 may be passed through GDL 105 and/or flow field insert.

As also shown in FIGS. 3A and 3B, in one aspect, a hydrogen-containing gas stream 59 (shown in phantom in FIGS. 3A and 3B) and/or 59A may also be introduced to second gas stream 114, with or without the removal of gas stream 58. For example, as disclosed herein, hydrogen-containing gas stream 59 and/or 59A may be provided to enhance the hydrogen gas content of the second gas stream 114 introduced to second anode 102, for example, to enhance the hydrogen content in third gas stream 116 (see FIG. 3), that is, output stream 116, and/or to replace at least some of the hydrogen gas content removed in gas stream 58. As shown in FIGS. 3A and 3B, the introduction of hydrogen-containing gas stream 59 and/or 59A into space 101 may be practiced with or with the presence of GDL 105, for example, as shown in FIG. 3B, hydrogen-containing gas stream 59 may be introduced through a gas-permeable GDL 105 and/or flow field insert.

Figure 4:
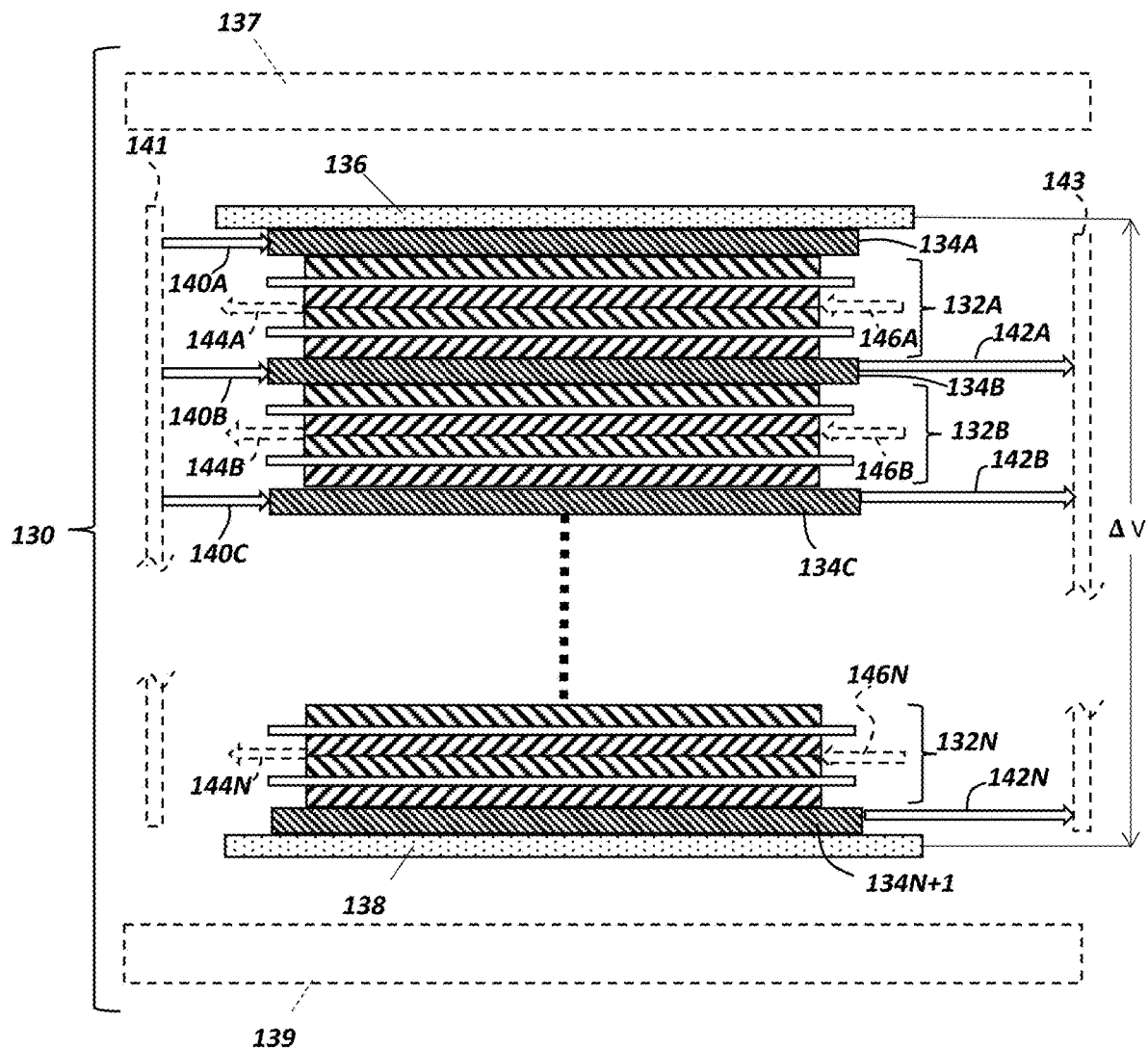
FIG. 4 is a schematic elevation view of a hydrogen purifier stack having a plurality of a hydrogen purifier cells shown in FIG. 1 and/or FIG. 3, according to an aspect of the invention.

FIG. 4 is a schematic elevation view of a hydrogen purifier stack 130 having a plurality of a hydrogen purifier cells 132A though 132N, for example, having two or more hydrogen purifier cells 10 shown in FIG. 1 and/or two or more hydrogen cells 50 shown in FIG. 2, according to an aspect of the invention. According to aspects of the invention, "N" is the number of purifier cells that may be included in hydrogen purifier stack 130 according to aspects of the invention. Specifically, it is envisioned that N may range from 1 to 1,000 cells, but typically may range from 40 cells to 100, for example, 80 cells.

According to this aspect of the invention, each of the hydrogen purifier cells 132A-132N include double MEAs (DMEAs), as disclosed herein, separated by electrically-conductive and gas-impermeable layers or plates 134A-134N+1, for example, "bi-polar plates." Layers or plates 134A-134N+1 may be similar to and have the same characteristics as layers or plates 84 and 86 shown and described with respect to FIG. 3. For example, layers or plates 134A-134N+1 may have one or more lateral passages and a plurality of axial passages or channels, for example, flow distribution passages, adapted and located to introduce gas flows to hydrogen purifier cells 132A-132N and/or remove gas flows from hydrogen purifier cells 132A-132N. According to aspects of the invention, some plates 134A-134N+1, for example, plate 134B shown in FIG. 4, may include passages, for example, isolated separate passages, adapted and located to both remove a gas stream from a second cathode of a DMEA 132A and introduce a gas stream from a first anode of a DMEA 132B. In contrast, terminal plate 134A may include passages adapted and located to only introduce a gas stream to the first anode of a DMEA 132A, and terminal plate 134N+1 may include passages adapted and located to only remove a gas flow from a second cathode of a DMEA 132N. In one aspect, terminal plate 134A and/or terminal plate 134N+1 may not have passages, that is, they may be devoid of passages.

According to aspects of the invention, as disclosed herein, the reduction reaction associated with the cathodes pursuant to Equation 2 may provide the electrons ($e^-$) for the oxidation reaction associated with the anodes, for example, the prior or previous anode in the stack, pursuant to Equation 1. In one aspect, this flow of electrons ($e^-$) in hydrogen purifier stack 130 is such that the DMEAs of hydrogen purifier stack 130 are electrically in series. However, in order to facilitate illustration and disclosure of this aspect of the invention, the flow of electrons ($e^-$) from the second anodes to the first cathodes and the flow of electrons ($e^-$) from the first anodes to the second cathodes, for example, of neighboring cells, in hydrogen purifier stack 130 are omitted from FIG. 4.

Hydrogen purifier stack 130 also includes opposing bus bars or current collectors 136 and 138 and end plates 137 and 139 (shown in phantom in FIG. 4). Current collectors 136 and 138 may be similar in design, size, and construction to current collectors 88 and 90 shown and disclosed with respect to FIG. 3. End plates 137 and 139, as known in the art, may be relatively thick metal plates that function to assist in compressing stack 130, for example, via a plurality of mechanical fasteners (not shown) extending between end plates 137 and 139. For instance, end plates 137 and 139 may be associated with a plurality of threaded bolts having threaded nuts which, upon tightening on the bolts, compress the stack 130 between plates 137 and 139.

As shown in FIG. 4, a plurality of input or first gas streams 140A-140N having a hydrogen gas ($H_2$) content and non-hydrogen gas content may be introduced to DMEAs 132A-132N via inlets and flow distribution passages in plates 134A-134N. As shown in FIG. 4, first gas streams 140A-140N may be provided, for example, via one or more gas supply manifolds 141 (shown in phantom in FIG. 4) for example, a common gas supply manifold. As also shown in FIG. 4, a plurality of discharge or third gas streams 142A-142N may be removed from DMEAs 132A-132N, for example, via flow extraction passages and outlets in plates 134A-134N. As shown in FIG. 4, third gas streams 142A-142N may be discharged, for example, via one or more gas collection manifolds 143 (shown in phantom in FIG. 4), for example, a common gas collection manifold. As disclosed herein, the plurality of output or third gas streams 142A-142N have a higher hydrogen gas ($H_2$) content and a lower non-hydrogen gas content than the plurally of input gas streams 140A-140N, respectively. For example, as disclosed herein, the non-hydrogen gas content of third gas streams 142A-N may have at most 100 ppm of non-hydrogen gas, or at most 20 ppm, or at most 10 ppm, or at most 5 ppm, or at most 2 ppm, or at most 1 ppm, or even at most 500 ppb, "on a dry basis." or even at most 500 ppb, "on a dry basis." According to aspects of the invention, each of the flow of gas streams from the input flows 140A-140N to the output flows 142A-142N may flow in parallel through the DMEAs 132A-132N, for example, from the one or more gas supply manifolds 141 to the one or more gas collection manifolds 143.

Though not shown in FIG. 4 to facilitate illustration and disclosure of the invention, according to aspects of the invention, hydrogen purifier stack 130 may typically include a plurality of anode exhaust ports, passages, and/or manifolds to allow excess source gas from streams 140A-140N to be allowed to be discharged from hydrogen purifier stack 130.

As also shown in FIG. 4, hydrogen purifier stack 130 may be powered by a voltage, $\Delta V$, and a current, I, between current collectors 136 and 138. The voltage $\Delta V$ may be provided externally, for example, from one or more DC power supplies, the local electrical grid, a fuel cell, by photovoltaics, and/or wind turbine; and/or internally, for example, from electro-chemical potentials and reactions occurring in DMEAs 132A-132N in stack 130. In one aspect, the voltage $\Delta V$ may be regulated to regulate the current through stack 130. A higher electric current, may enhance the chemical reactions within stack 130 and increase the hydrogen gas production rate. The amount of amperage required to enhance the output of aspects of the invention will be dependent, among other things, upon the size of the purifier and the number of cells in the purifier.

As also shown in FIG. 4, according to one aspect of the invention, one or more DMEAs 132A-132N in hydrogen purifier stack 130 may comprise a purifier cell 50 shown and described with respect to FIG. 2. That is, in one aspect, one or more the DMEAs 132A-132N, for example, all of DMEAs 132A-132N, may be adapted to remove at least some gas stream, for example, the second gas stream 38 shown in FIG. 2, evolved from the first cathode of DMEAs 132A-132N. This removal of at least some of the gas stream from the second gas stream of DMEAs 132A-132N is indicated by gas streams 144A-144N (shown in phantom) in FIG. 4. Gas streams 144A-144N in FIG. 4 correspond to gas flow stream 58 in FIG. 2. As disclosed herein, according to an aspect of the invention, it is understood that the removal of gas stream 144A-144N, having at least some non-hydrogen gas content, reduces the partial pressure of the non-hydrogen gas introduced to a second anode of the DMEAs 132A-132N to thus reduce the passage of the non-hydrogen gas through the second anode. According to one aspect, gas flow streams 144A-144N may be discharged from hydrogen purifier stack 130 via discharge passages in hydrogen purifier stack 130, for example, a discharge gas manifold (not shown in FIG. 4.)

In addition, since some of the gas flow streams 144A-144N (in phantom) in FIG. 4 may contain some hydrogen gas content, in one aspect, at least some hydrogen gas may be introduced to the second gas streams (that is, second gas stream 38 shown in FIG. 2) in DMEAs 132A-132N to replenish at least some of the lost hydrogen gas and enhance the content of the hydrogen gas introduced to the second anodes of DMEAs 132A-132N. By replenishing any hydrogen gas lost via gas flow streams 144A-144N, aspects of the present invention can enhance the hydrogen content of the hydrogen gas produced by hydrogen purifier stack 130. This introduction of at least some hydrogen gas to the second gas streams of DMEAs 132A-132N is indicated by gas streams 146A-146N (in phantom) in FIG. 4. According to one aspect, gas streams 146A-146N may be introduced to hydrogen purifier stack 130 via passages in hydrogen purifier stack 130, for example, a gas manifold (not shown in FIG. 4.)

Figure 5:
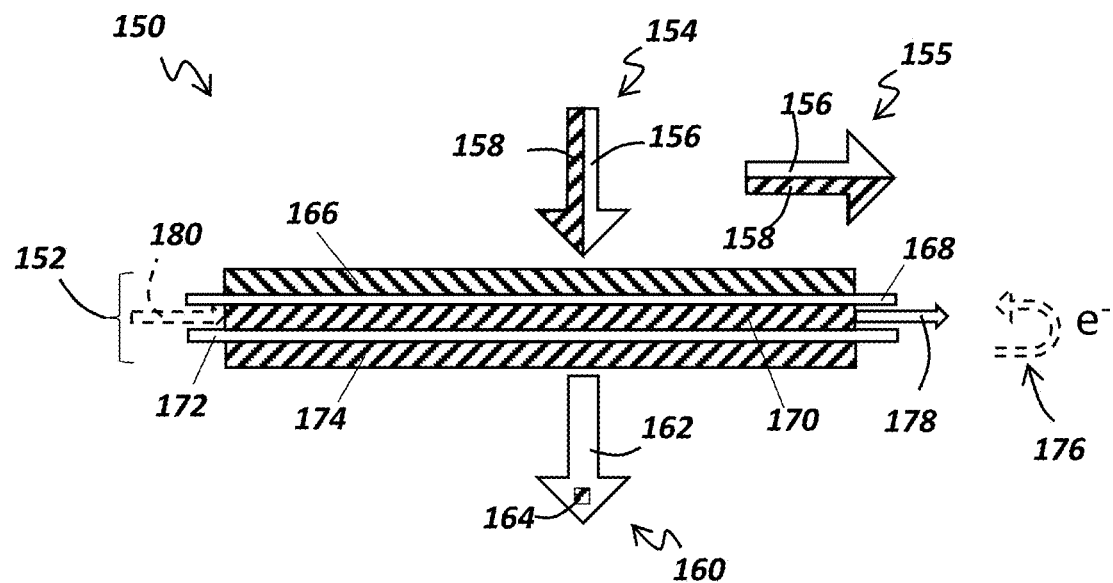
FIG. 5 is a schematic illustration of a hydrogen gas purifier cell according to another aspect of the invention.

FIG. 5 is a schematic illustration of a hydrogen gas purifier cell 150 according to a further aspect of the invention. According to this aspect, purifier cell 150 may have many of the features of purifier cell 10 and purifier cell 50 disclosed herein. Specifically, purifier cell 150 includes an DMEA 152 positioned to receive an input or first gas stream 154 having a first hydrogen gas content 156 and a first non-hydrogen gas content 158 and yields an output or third gas stream 160 having an output or third hydrogen gas content 162 greater than the first hydrogen gas content 156 and an output or third non-hydrogen gas content 164 less than the first non-hydrogen gas content 158. As is typical in the art, at least some of input or first gas stream 154 may not oxidize at anode 166, but be removed as gas stream 155, for example, an "exhaust gas stream." Typically, exhaust stream 155 may be captured and directed, for example, via channels, manifolds, and ports, to further processing or disposed of as needed.

Again, output or third gas stream 160 will typically have a greater pressure than the pressure of input or first gas stream 154, though the pressure may be lower than the first pressure of the first gas stream 154. However, according to this aspect of the invention, DMEA 152 of purifier cell 150 includes only three electrodes, where the second electrode performs the dual function of both a first cathode and a second anode, as disclosed herein.

Specifically, as shown in FIG. 5, DMEA 152 of purifier cell 150 includes a first anode 166, a first electrolyte 168, a first cathode/second anode (or "dual electrode") 170, a second electrolyte 172 and a second cathode 174. In a fashion similar to the components and operation of cell 10 and cell 50 disclosed herein, first anode 166 may have all the features of the first anodes disclosed herein; first electrolyte 168 and second electrolyte 172 may have all the features of the electrolytes disclose herein; and second cathode 174 may have all the features of the second cathodes disclosed herein.

In addition, dual electrode 170 of cell 150 may have all the features and characteristics of an anode or a cathode disclosed herein, for example, being electrically conductive, gas-permeable, and containing a catalyst. However, according to this aspect of the invention, dual electrode 170 performs the dual function of first reducing the hydrogen ions ($H^+$) transferred through first electrolyte 168 with electrons ($e^-$) to yield hydrogen gas ($H_2$), according to Equation 2, and then oxidizing the hydrogen gas ($H_2$) to yield hydrogen ions ($H^+$) and electrons ($e^-$), according to Equation 1. In one aspect, the electrons ($e^-$) produced in the oxidation of hydrogen gas ($H_2$) in dual electrode 170 may be the source of electrons ($e^-$) consumed in the reduction of the hydrogen ions ($H^+$) in dual electrode 170. This internal transfer of electrons ($e^-$) within dual electrode 170 in DMEA 152 is represented by the electron loop 176 shown in phantom in FIG. 5. According to aspects of the invention, 1 or more cells 150 may be used for cells 132A-132N of stack 130 shown in FIG. 4.

According to one aspect of the invention, a discharge gas stream (gas stream 58 in FIG. 2) may be removed from and/or make-up gas stream (gas stream 59 and/or 59A in FIG. 2) may be introduced to dual electrode 170 of cell 150. As shown in FIG. 5, a gas stream 178 may be removed from dual electrode 170, for example, through the gas-permeable structure of dual electrode 170, to reduce the partial pressure of the non-hydrogen gas passed through first electrode 168, as disclosed herein. Also, with or without the removal of gas stream 178, a make-up, hydrogen ($H_2$) gas-containing gas stream 180 (shown in phantom in FIG. 5) may be introduced to dual electrode 170, for example, through the gas-permeable structure of dual electrode 170, to replace or enhance the hydrogen gas ($H_2$) content of the gas stream introduced to second electrolyte 172, as disclosed herein. As in other aspects of the invention, a make-up, hydrogen ($H_2$) gas-containing gas stream 180 may be introduced to dual electrode 170 by "back diffusion" of at least some of gas stream 160 back through second electrode 172 to dual electrode 170.

In one aspect, in order to enhance the distribution of the gas streams and/or the hydrogen ions ($H^+$) about the electrode surfaces, one or more gas diffusion layers (GDL), not shown in FIG. 5, and/or flow field insert, as described with respect to FIG. 3B, may be positioned within cell 150. For example, cell 150 may include a GDL and/or flow field insert associated with first anode 166, dual electrode 170, and/or second cathode 174.

As in other aspects of the invention, though having only three electrodes 166, 170, and 174, a third hydrogen gas content 162 of third gas stream 160 of hydrogen purifier cell 150 is greater than the first hydrogen gas content 156; and the third impurity gas content 164 is less than the first impurity gas content 158. For example, the third gas stream 160 may have a purity, on a "dry basis," in percent that is greater than the purity of the first gas stream 154 156. For example, in one aspect, the purity of the third gas stream 160 may be at least 99.99 percent hydrogen, by volume, or at least 99.999 (five 9s) percent, by volume, or 99.9999 (six 9s) percent by volume. According to another aspect of the invention, the purity of the third gas stream 160 may be expressed on a basis of the third impurity gas content 164. For example, in one aspect the third impurity gas content 164 may be at most 100 ppm of impurity gas. In other aspects of the invention, the third impurity gas content 164 produced may be at most 20 ppm, or at most 10 ppm, or at most 5 ppm, or at most 2 ppm, or at most 1 ppm. In other aspects of the invention, the third impurity gas content 164 of the hydrogen gas produced may be at most 750 ppb (that is, at most 0.750 ppm), or at most 500 ppb, or at most 200 ppb, or even at most 100 ppb. As known in the art, these impurity contents of the hydrogen gas produced are typically "on a dry basis."

In addition, according to aspects of the invention, the resulting gas stream, that is, third gas stream 160 in FIG. 5, having a higher hydrogen gas content 162 and lower impurity gas content 164, may typically be provided at a higher pressure than the pressure of the feed or first gas stream 154. For example, according to aspects of the invention, where first gas stream 154 may have a pressure of at most 1 psig, third gas stream 160 may have a pressure of at least 150 psig. In one aspect, the pressure of third gas stream 160 may be at least 120 psig, or at least 200 psig, or even at least 10,000 [10 thousand] psig. In other aspects pf the invention, the pressure of third gas stream 160 may not be greater than the pressure of the feed or first gas stream 154; in one aspect, the pressure of the third gas stream 160 may less than the pressure of the first gas stream 154.

Figure 6:
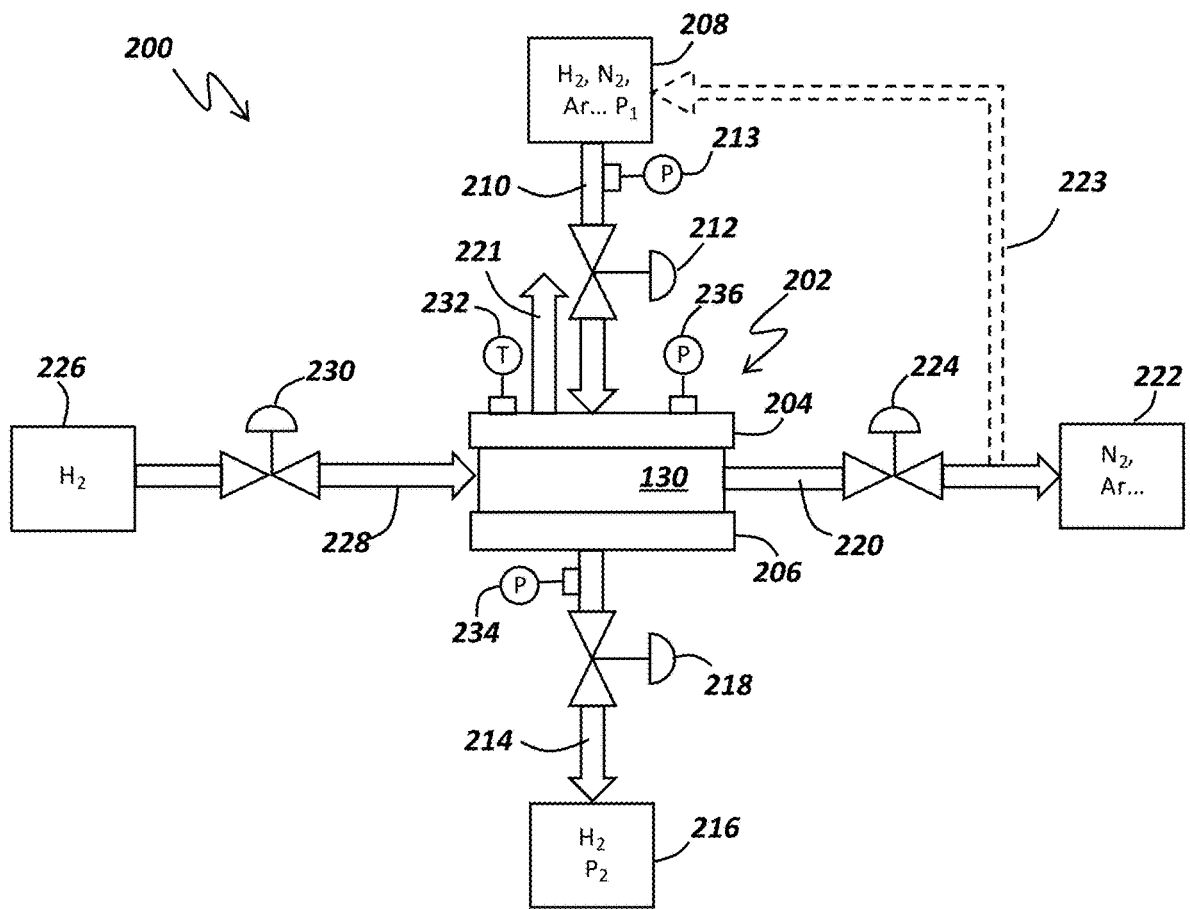
FIG. 6 is a schematic view of a hydrogen gas purifier system having one or more hydrogen purifiers having one or more hydrogen purifier stacks shown in FIG. 4, according to an aspect of the invention.

FIG. 6 is a schematic view of a hydrogen gas purifier system 200 having one or more hydrogen purifiers 202 having one or more hydrogen purifier stacks 130 shown in FIG. 4, according to an aspect of the invention. The one or more hydrogen purifier stack 130 may include any one or more of the hydrogen purifier cells disclosed herein, for example, one or more cells 10, one or more cells 50, and/or one or more cells 150, or a combination thereof. The one or more hydrogen purifier stacks 130 may be contained by end plates 204 and 206, for example, similar to end plates 137 and 139 shown in FIG. 4, As shown in FIG. 6, hydrogen gas purifier system 200 includes a source of hydrogen-containing gas 208 operatively connected to one or more hydrogen purifiers 202 via one or more conduits or pipes 210. The source of hydrogen-containing gas 208 may be a storage tank, another gas purifier 202, one or more fuel cells, or one of various industrial processes. As disclosed herein, the source of hydrogen-containing gas 208 typically contains at least some non-hydrogen or impurity gas, such as, nitrogen ($N_2$), argon (Ar), carbon dioxide ($CO_2$), carbon monoxide (CO), methane ($CH_4$), and/or oxygen ($O_2$). As shown in FIG. 6, the flow gas from the source of hydrogen-containing gas 208 may be regulated by one or more flow control valves 212, for example, a manual valve or an automated valve controlled by an appropriate control system (not shown), and/or a pressure regulator 213. In one aspect, the hydrogen-containing gas 208 may be introduced to system 200 under pressure, for example, by a gas pressurizing device (not shown), such as, one or more blowers, fans, or compressors. In another aspect, the hydrogen-containing gas 208 may be drawn into system 200 by a gas pressure reducing device or vacuum device (not shown), such as, a one or more blowers, fans, or compressors. For example, a source of vacuum may be operatively connected to one or more conduits or pipes 214; to one or more discharge conduits 220; and/or to one or more discharge conduits 221 in FIG. 6.

After introduction of the hydrogen-containing gas from source 208 and appropriate oxidation and reduction, as disclosed herein, the higher purity hydrogen gas is discharged from the one or more hydrogen purifier stacks 202 into one or more conduits or pipes 214 to storage or further processing 216. For example, further processing 216 may be a dryer or desiccator to remove at least some water vapor, and/or to further purification, for example, to remove at least some trace impurities, if present. The purification process may comprise a pressure swing absorption (PSA) system, a temperature swing absorption (TSA), a "getter" gas purifier, or to another gas purifier system 200. In one aspect, further processing 216 may include a liquefier, for example, a cryo-cooler. As shown in FIG. 6, the flow of gas from the one or more hydrogen purifier stacks 202 may be regulated by one or more flow control valves 218, for example, a manual valve or an automated valve controlled by appropriate control system (not shown).

As also indicated in FIG. 6, typically, the hydrogen-containing gas from source 208 may typically have a pressure, or first pressure, $P_1$, and after passing through one or more hydrogen purifier stacks 202 the gas introduced to storage 216 may typically have a higher pressure, or third or output pressure, $P_2$ greater than the first pressure $P_1$, as disclosed herein. Pressure $P_2$ may be any one of the output pressures disclosed herein. In one aspect, pressure $P_2$ may comprise a pressure lower than pressure $P_1$, for example, when the hydrogen-containing gas 208 is drawn into system 200, for instance, by vacuum.

As also indicated in FIG. 6, in one aspect, the one or more hydrogen purifier stacks 202 may include one or more purifier cells 50 (and disclosed and described with respect to FIG. 2) having discharge gas streams or displaced gas streams 58 and, possibly, hydrogen-containing gas stream 59. As shown in FIG. 6, gas purifier system 200 may include one or more discharge conduits 220 for removing gas stream 58 (FIG. 2) and one or more discharge conduits 221 for removing anode exhaust gas (for example, anode gas stream 13 shown in FIG. 1) from the one or more hydrogen purifier stacks 202 and direct the discharged gas stream in conduit 220 and/or exhaust gas stream in conduit 221 to other processing, storage, or disposal 222. The other processing of the gas streams in conduits 220 and 221 may include purification, for example, via another system 200, among others; venting to atmosphere; combustion via a "flare"; or other processing. As shown in FIG. 6, the flow of discharged gas via conduit 220 from the one or more hydrogen purifier stacks 202 may be regulated by one or more flow control valves 224, for example, a manual valve or an automated valve controlled by appropriate control system (not shown). In one aspect, at least some of the discharged gas stream (stream 58 in FIG. 2) may be introduced to purifier 200, such as the purifier 200 shown in FIG. 6 or another purifier 200, to recover and/or purify any hydrogen gas in the discharged gas, for example, in conduit 220. For example, as shown in FIG. 6, at least some of the discharged gas (stream 58 in FIG. 2) in conduit 220 may be forwarded to input conduit 210 via conduit or pipe 223 (shown in phantom in FIG. 6). The flow in conduit 223 may include appropriate flow control and/or pressure control (not shown) as disclosed herein.

In one aspect, the one or more purifier cells 50 may be provided with hydrogen-containing "make-up" gas stream 59 (for example, see FIG. 2) from source 226, such as, from a discharge conduit 214 from this or another system 200 or another hydrogen gas source, via one or more conduits or pipes 228. The flow of "make up" gas through one or more conduits 228 to the one or more hydrogen purifier stacks 202 may be regulated by one or more flow control valves 230, for example, a manual valve or an automated valve controlled by appropriate control system (not shown). In one aspect, the flow of make-up gas (stream 59 in FIG. 2) may not be sourced externally, as indicated in FIG. 6, but may also be sourced and routed internally in stack 130, for example, from one or more cells 50 (see FIG. 2) to one or more cells 50, the flow of which may be regulated and controlled based upon flow and/or pressure.

According to one aspect of the invention, the temperature of the one or more one or more hydrogen purifier stacks 130 of gas purifier system 200 may be regulated and controlled to, among other things, optimize the purification performance of the DMEAs of the stacks 130 and/or avoid overheating of the stacks 130. For example, in one aspect, the temperature of the stacks 130 may be maintained at at least 30 degrees C., but is typically maintained at range of between 50 degrees C. to 80 degrees C. It is understood that reducing the operating temperature of the electrolytes in the cells of stacks 130, for example, to between 45 degrees C. to 55 degrees C., may enhance the purity of the hydrogen gas produced, while requiring a more reasonable electrical power consumption. In one aspect, as shown in FIG. 6, the temperature of the one or more hydrogen purifier stacks 130 may be monitored and regulated by one or more temperature sensors 232. The temperature of the one or more hydrogen purifier stacks 130 detected by temperature sensor 232 may be controlled by one or more heating or cooling circuits regulated and controlled by an appropriate control system (not shown). The heating or cooling circuits of the one or more hydrogen purifier stacks 130 may include passages in the one or more hydrogen purifier stacks 130 though which heating or cooling fluid may be passed to regulate the temperature of the one or more hydrogen purifier stacks 130.

According to one aspect of the invention, the pressure of the one or more hydrogen purifier stacks 130, the pressure of the gas from the source 208, and/or pressure of the discharge gas of gas purifier system 200 may be regulated and controlled to, among other things, optimize the performance of the reactions within the DMEAs of the stacks 130. For example, one aspect, the pressure of the hydrogen gas produced by the one or more stacks 130 may be monitored and regulated by one or more pressure sensors 234. It is understood that in some aspects the pressure of hydrogen gas generated in system 200 may affect the purity of the hydrogen gas produced. The pressure of the hydrogen gas produced that is detected by pressure sensor 234 may be regulated and controlled by an appropriate control system (not shown).

In addition, in one aspect, the pressure of the one or more stacks 130 may be regulated and controlled to enhance the performance, for example, the efficiency, of the DMEAs of the stacks 130. In one aspect, the pressure of the first cathode and/or the second anode of the one or more hydrogen purifier stacks 130 may be regulated and controlled to enhance the performance, for example, the efficiency, of the DMEAs of the stacks 130. In one aspect, as shown in FIG. 6, the pressure of one or more stacks 130, for example, the pressure of the first cathode and/or the second anode, may be monitored and regulated by one or more pressure sensors 236. The pressure of the one or more hydrogen purifier stacks 130 detected by pressure sensor 236 may be controlled by an appropriate control system (not shown).

Figure 7:
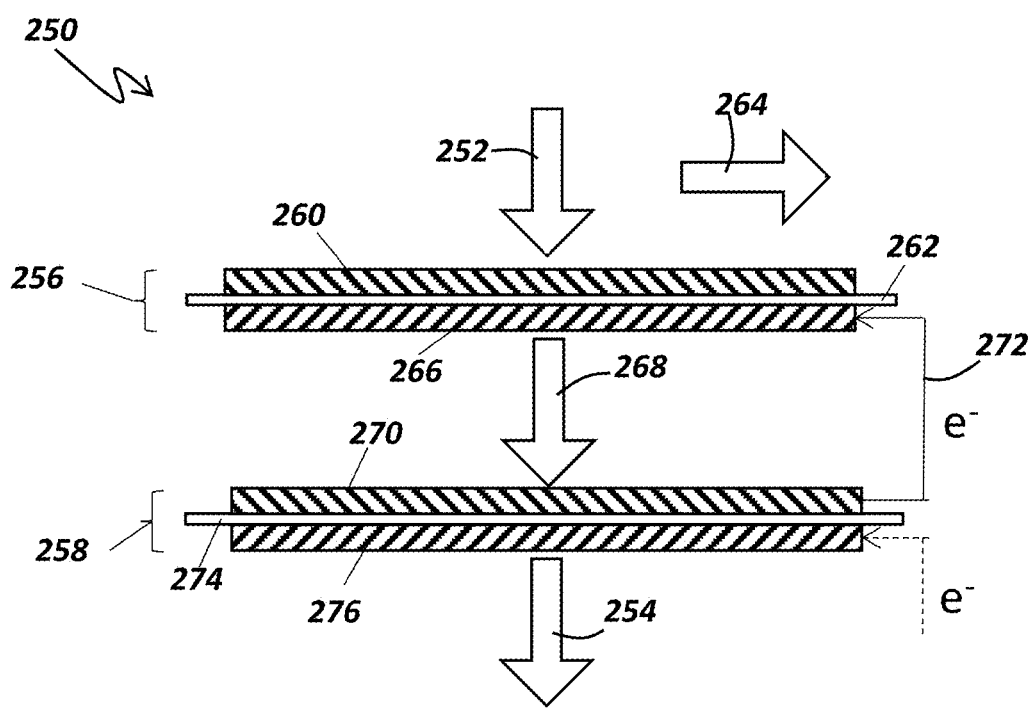
FIG. 7 is a schematic illustration of a water electrolyzer cell according to another aspect of the invention.

FIG. 7 is a schematic illustration of a water electrolyzer cell 250 according to another aspect of the invention. According to this aspect, a water electrolyzer cell 250 cell comprises a electrochemical cell for electrolyzing water to generate hydrogen gas, specifically, a hydrogen gas having less undesirable impurity gas, such as, oxygen ($O_2$). As shown in FIG. 7, water electrolyzer cell 250 is positioned and adapted to receive a feed or first fluid stream 252 containing water. First fluid stream 252 may contain liquid water and/or gaseous water (that is, steam). (It is to be understood that any reference to "fluid" herein may refer to a liquid fluid, a gaseous fluid, or both a liquid fluid and a gaseous fluid.) According to aspects of this invention, cell 250 is adapted to produce a hydrogen gas stream or third gas stream 254 having little or no gas impurities, including little or no oxygen gas. The third gas stream 254 may be referred to as a discharge gas stream 254.

As shown schematically in FIG. 7, water electrolyzer cell 250, in a fashion similar to the hydrogen gas purifier cells disclosed herein, typically comprises a multilayer structure having components, for example, anodes and cathodes having thin planar or thin laminar construction, where the structures shown in FIG. 7 may comprise a side elevation view or a trans-axial cross-sectional view of water electrolyzer cell 250 that is not drawn to scale, but is drawn to facilitate disclosure of the invention.

According to aspects of the invention, to provide the desired hydrogen gas 254, water electrolyzer cell 250 typically includes a first MEA 256 and at least one second MEA 258. The first MEA 256 includes a first anode 260, which, in a fashion similar to other anodes disclosed herein, may typically be fluid-permeable, specifically, water- or gas-permeable, where at least some of the water in first fluid stream 252 may pass into anode 260, for example, in an axial direction as indicated by the arrow of first fluid stream 252. In addition, anode 260 includes at least some catalyst, for example, at least some platinum group metal-containing or iridium-containing catalyst, capable of enhancing the oxidation of the water to gaseous oxygen ($O_2$), hydrogen ions ($H^+$), and electrons ($e^-$), for example, pursuant to equation 3.

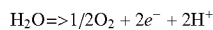

$$H_2O => 1/2 O_2 + 2e^- + 2H^+ \qquad \text{Equation 3}$$

In one aspect, in order to enhance the distribution of first fluid stream 252 about the surface of anode 260, an electrically-conductive gas diffusion layer (GDL) and/or flow field insert, not shown in FIG. 7, may be positioned between first fluid stream 252 and anode 260, for example, the GDL may be applied over the surface of anode 260 contacted by first fluid stream 252. In one aspect, the GDL used for the cell 250, or the GDL layer used in any aspect disclosed herein, may be a metal-based GDL, for example, a platinum-coated titanium GDL, or its equivalent.

Due to the permeability of anode 260, water ($H_2O$) passes into anode 260, and due to the electrical conductivity of anode 260, electrons ($e^-$) are conducted away from anode 260, and according to aspects of the invention, the hydrogen ions ($H^+$) generated in anode 260 are introduced to an electrolyte 262. Electrolyte 262 may be similar to any of the other electrolyte disclosed herein, for example, electrolyte 262 may be an acidic electrolyte.

As is typical in the art, at least some of input or first fluid stream 252 may not diffuse through anode 260, but be removed as fluid stream 264, for example, an "exhaust gas stream." Typically, exhaust stream 264 may be captured and directed, for example, via channels, manifolds, and ports, to further processing or disposed of as needed.

Electrolyte 262, or a first electrolyte 262, is positioned and adapted to receive and transfer at least some of the hydrogen ions ($H^+$). Due to the close proximity of anode 260 to electrolyte 262, hydrogen ions ($H^+$) are passed from anode 260 to electrolyte 262. First electrolyte 262 comprises a barrier between the first anode 260 and the electrode 266. First electrolyte 262 may comprise any material or substance capable of transmitting the hydrogen ions ($H^+$), for example, selectively transmitting hydrogen ions (H+), that is, protons, from first anode 260 to electrode 266. That is, in one aspect, electrolyte 262, and any electrolyte disclosed herein, may be referred to as a "proton-conductive material," while substantially preventing the flow of gas. First electrolyte 262 may typically be acidic, for example, an acidic polymer containing a perfluorosulfonic acid (PFSA). In one aspect, electrolyte 262 may be a membrane marketed under the trademark Nafion™ by The Chemours Company of Wilmington, Delaware, or its equivalent. In other aspects, electrolyte 262 may contain one or more of the following acids: phosphoric acid [$H_3PO_4$], sulfuric acid [$H_2SO_4$], or any other hydrogen ion ($H^+$) conducting acid. In one aspect, first electrolyte 262 may comprise a proton exchange membrane (PEM), as known in the art.

Electrode 266, which may be referred to as "cathode" 266, as known in the art, or a first cathode 266, is positioned to receive at least some of the hydrogen ions ($H^+$) transferred by the first electrolyte 262. Similar to other cathodes disclosed herein, first cathode 266 is fluid permeable and typically contains a catalyst, for example, a platinum group-containing catalyst, adapted to enhance the reaction (that is, reduction) of at least some of the hydrogen ions ($H^+$) that pass through first electrolyte 262 by reacting with at least some electrons ($e^-$) pursuant to Equation 4, as known in the art.

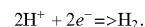

$$2H^+ + 2e^- => H_2. \qquad \text{Equation 4}$$

The resulting, or "evolved," hydrogen gas ($H_2$) 268, or a second fluid stream 268 containing hydrogen gas ($H_2$), is transferred though gas permeable first cathode 266 as indicated as gas stream 268 in FIG. 7, or a second fluid stream 268.

In one aspect, in order to enhance the distribution of the hydrogen gas ($H_2$) about the surface of second anode 270, a gas diffusion layer (GDL) and/or flow field insert, not shown in FIG. 7, may be positioned between first cathode 266 and second anode 270, for example, the GDL and/or flow field insert may be applied over the surface of second anode 270.

As shown in FIG. 7, according to aspects of the invention, second fluid stream 268 containing hydrogen gas (H₂) may then be introduced to second MEA 258, specifically, to electrode 270, or second anode 270, of second MEA 258. In the schematic diagram of the electrolyzer cell 250 shown in FIG. 7, first MEA 256 is shown spaced from second MEA 258 to facilitate illustration and disclosure of the invention. However, according to aspects of the invention, the spacing between first MEA 256 and second MEA 270 may be minimal, for example, where the surface of first cathode 266 may abut or contact the surface of second anode 270. However, in one aspect, at least some spacing, for example, 0.1 millimeters [mm] to 0.5 mm, may be present between the surface of first cathode 266 and the surface of second anode 270.

According to aspects of the invention, and contrary to the existing art, second fluid stream 268 having hydrogen gas (H₂) may then be introduced to second MEA 258 without removing or extracting second fluid stream 268 from electrolyzer cell 250. In other words, though some portion of second fluid stream 268 may undesirably "escape" from electrolyzer cell 250, according to one aspect of the invention, substantially all of second fluid stream 268 produced at first cathode 266 is received by second anode 270. For example, in one aspect, second fluid stream 268 may be allowed to pass from first cathode 266 of MEA 256 to second anode 270 of MEA 258 without any intervening handling or treatment, for instance, without passing outside of electrolyzer cell 250. In one aspect, the evolved hydrogen gas (H₂) formed in first cathode 266 may substantially be immediately oxidized to hydrogen ions (H⁺) at second anode 270. In one aspect, second fluid stream 268 may be allowed to pass directly from first cathode 266 of MEA 258 to second anode 270 of MEA 258 of electrolyzer cell 250, for instance, without passing outside of electrolyzer cell 250 before reaching second cathode 270.

The second anode 270 is positioned to be contacted by the second fluid stream 268 having hydrogen gas (H₂). Second anode 270 of second MEA 258 may be similar to, if not identical to, first anode 260 of MEA 256. Second anode 270 may be hydrogen-gas permeable, where at least some of the hydrogen gas in second fluid stream 268 may pass through second anode 40, for example, in an axial direction, as indicated by the arrow of second fluid stream 268. In addition, second anode 270 includes at least some catalyst, for example, at least some platinum-containing catalyst, capable of enhancing the oxidation of hydrogen gas to hydrogen ions (H⁺), as indicated by Equation 1, which is reproduced below.

$$H_2 => 2H^+ + 2e^-. \qquad \text{Equation 1}$$

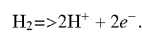

In one aspect, in order to enhance the distribution of second fluid stream 268 about the surface of second anode 270, a gas diffusion layer or GDL and/or flow field insert, not shown in FIG. 7, may be positioned between second fluid stream 268 and second anode 270, for example, the GDL and/or flow field insert may be applied over the surface of second anode 270 contacted by second fluid stream 268.

According to aspects of the invention, the catalyst contained in second anode 270 promotes or enhances the oxidation of the hydrogen gas in second fluid stream 268 to yield or produce hydrogen ions (H⁺) and electrons (e⁻) pursuant to Equation 1, above. In one aspect, the electrons (e⁻) generated in second anode 270 may be directed back to first cathode 266, as indicated by arrow 272 in FIG. 7, to supply at least some of the electrons (e⁻) used to reduce the hydrogen ions (H⁺) to hydrogen (H₂) at first cathode 266, pursuant to Equation 4. Due to the permeability of second anode 270, at least some of the hydrogen gas (H₂) generated in second anode 270 may pass through second anode 270, and, according to aspects of the invention, is introduced to or come in contact with an electrolyte 274.

Electrolyte 274 of MEA 258, or a second electrolyte 274, is positioned and adapted to receive and transfer at least some of the hydrogen ions (H⁺) received from the second anode 270. Second electrolyte 274 comprises a gas barrier between the second anode 270 and the cathode 276. Second electrolyte 274 may be similar to, if not substantially identical to, first electrolyte 262, and comprise any material or substance capable of transmitting the hydrogen ions (H⁺), for example, selectively transmitting hydrogen ions (H⁺), that is, protons, from second anode 270 to an cathode 276. Again, as noted with respect to first electrolyte 262, in one aspect, second electrolyte 274 may be referred to as a "proton-conductive material." Second electrolyte 274 may typically be acidic, for example, containing one or more of the acids identified herein. However, in one aspect, second electrolyte 274 may comprise a PEM, as known in the art.

Electrode 276, or second cathode 276, is positioned to receive at least some of the hydrogen ions (H⁺) transferred by second electrolyte 274. Similar to the second anode 266, second cathode 276 is typically permeable and contains a catalyst, for example, a platinum-containing catalyst, adapted to enhance the reduction of at least some of the hydrogen ions (H⁺) using at least some electrons (e⁻) pursuant to Equation 2, which is reproduced below.

$$2H^+ + 2e^- => H_2. \qquad \text{Equation 2}$$

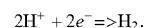

The resulting, or "evolved," hydrogen gas (H₂), or a third fluid stream 254 containing hydrogen a gas (H₂), is produced by electrolysis cell 250.

In one aspect, in order to enhance the distribution of the hydrogen ions (H⁺) about the surface of second cathode 276, a gas diffusion layer (GDL) or a flow field insert, not shown in FIG. 7, may be positioned between second electrolyte 274 and second cathode 276, for example, the GDL and/or flow field insert may be applied over the surface of second cathode 276. In one aspect, a GDL or a flow field insert, not shown in FIG. 7, may be positioned adjacent to the downstream surface of second cathode 276 to enhance the removal of third fluid stream 254.

According to aspects of the invention, the third fluid stream 254 of electrolysis cell 250 may typically contain hydrogen gas (H₂) with little or no undesirable impurity gases, for example, little or no oxygen gas.

According to aspects of the invention, in electrolysis cell 250, by passing the second fluid stream 268 from first anode 266 of MEA 256 to second cathode 270 of second MEA 258 can provide a more efficient device providing a purer hydrogen gas than the prior art. Among other things, the passing of the second fluid stream 268 from first cathode 266 to second anode 270, for example, directly, minimizes the content of impurities, for example, oxygen gas impurities, in the third fluid stream 254.

Figure 8:
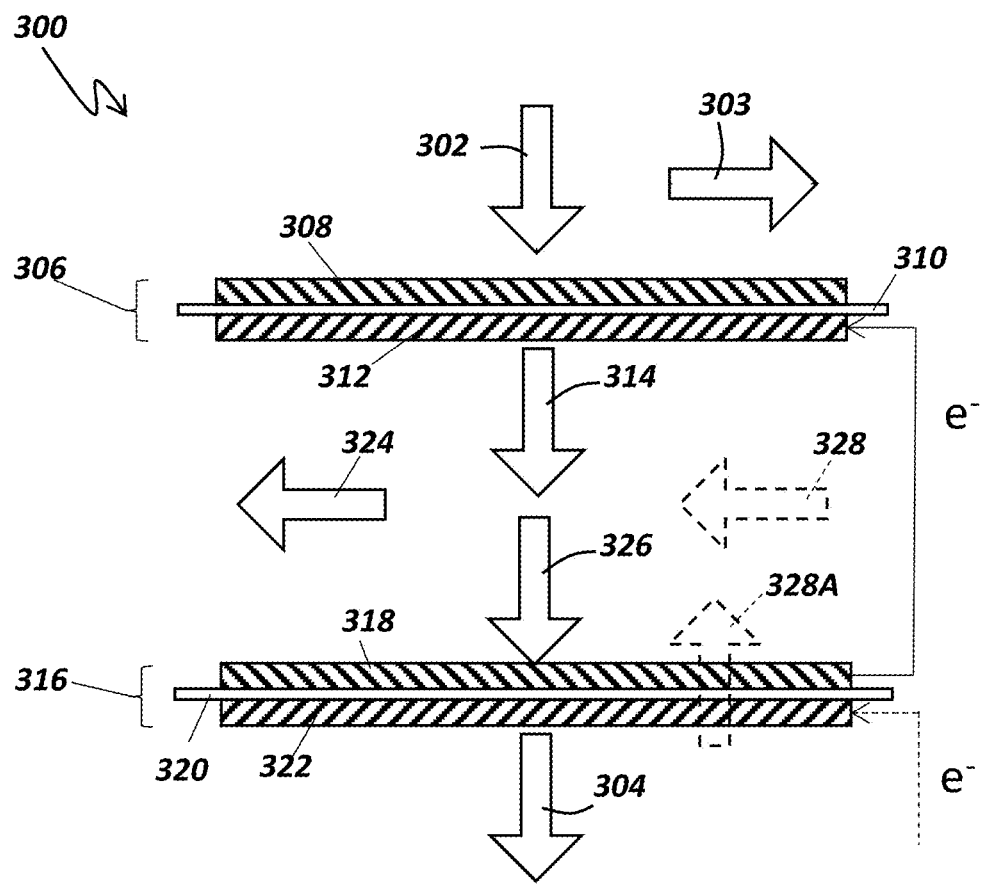
FIG. 8 is a schematic illustration of a water electrolyzer cell according to another aspect of the invention.

FIG. 8 is a schematic illustration of a water electrolyzer cell 300 according to another aspect of the invention. According to this aspect, electrolyzer cell 300 may have many of the features of electrolyzer cell 250; however, electrolyzer cell 300 further includes at least one gas discharge or release between the MEAs. It is believed that this reduction in the second fluid stream content reduces the partial pressure of the non-hydrogen gas, for example, the partial pressure of oxygen, between the MEAs and thus reduces the partial pressure gradient driving force of the undesirable non-hydrogen gas through the second MEA. In a further aspect, since some of the desirable hydrogen gas will be lost when removing some of the second fluid stream, at least some hydrogen gas may be introduced between the MEAs to function as a "make-up" hydrogen gas for the hydrogen gas possibly lost with the removal of some of the second fluid stream.

As shown in FIG. 8, water electrolyzer cell 300 is positioned and adapted to receive a feed or first fluid stream electrolyzer cell 302. According to aspects of this invention, cell 300 is adapted to produce a hydrogen gas stream or third fluid stream 304 having little no gas impurities, including little or no oxygen gas. The third gas stream 254 may be referred to as a discharge gas stream 254. As shown in FIG. 8, similar to electrolyzer cell 250, typically comprises a multilayer structure having components, for example, anodes and cathodes having thin planar or thin laminar construction, where the structures shown in FIG. 8 may comprise a side elevation view or a trans-axial cross-sectional view of electrolyzer cell 300 that is not drawn to scale, but is drawn to facilitate disclosure of the invention.

In one aspect, electrolyzer cell 300 shown in FIG. 8 may have substantially the same first MEA 306 as in electrolyzer cell 250, that is, having a first anode 308, a first electrolyte 310, and a first cathode 312 to oxidize and reduce first fluid stream 302 to yield a second fluid stream 314 containing hydrogen gas ($H_2$) in a manner substantially identical to MEA 256 of electrolyzer cell 250 shown in FIG. 7. As is typical in the art, at least some of input or first fluid stream 302 may not oxidize at first anode 308, but may be removed as fluid stream 303, for example, an "exhaust fluid stream." In addition, electrolyzer cell 300 may have substantially the same second MEA 316 having a second anode 318, a second electrolyte 320, and a second cathode 322 to oxidize and reduce second fluid stream 314 to yield third fluid stream 304 containing hydrogen gas ($H_2$) in a manner substantially identical to electrolyzer cell 250 shown in FIG. 7. However, according to the aspect of the invention shown in FIG. 8 electrolyzer cell 300 includes at least one discharge gas stream or displaced gas stream 324 having hydrogen gas and non-hydrogen gas, such as, oxygen.

In one aspect, in order to enhance the distribution of the gas streams about the electrode surfaces, one or more gas diffusion layers (GDL) and/or gas-distribution media, not shown in FIG. 8, may be positioned within electrolyzer cell 300. For example, electrolyzer cell 300 may include a GDL and/or flow field insert associated with first anode 308, first cathode 312, second anode 318, and/or second cathode 322.

According to this aspect, after first fluid stream 302 is processed and passed through first MEA 306 to produce second fluid stream 314 having a hydrogen gas content and a non-hydrogen gas content 36, at least some of the second fluid stream 314 is removed via fluid stream 324. The removal of fluid stream 324 from fluid stream 314 yields a modified or intermediate fluid stream 326. According to aspects of the invention, removal of fluid stream 324 reduces the partial pressure of non-hydrogen gas in modified fluid stream 326 and this reduction in partial pressure reduces the partial pressure gradient across the second MEA 316 of the non-hydrogen gas content, which reduces the passage of the non-hydrogen gas through second MEA 316 to third fluid stream 304. Accordingly, according to aspects of the invention, the non-hydrogen gas content, for example, the oxygen gas content, of third fluid stream 304 is reduced providing a purer stream of hydrogen gas.

The removal of fluid stream 324 may be practiced by various means. In one aspect, fluid stream 324 may be removed by simply venting at least some of second fluid stream 314, for example, venting through the inherent spacing between first MEA 306 and second MEA 316, for instance, via the inherent spaces or voids between the surface of first cathode 312 and second anode 318. In another aspect, fluid stream 324 may be removed by providing paths, channels, or grooves, for example, radial or transverse channels or grooves, in the mating surface of first cathode 312, in the mating surface of second anode 318, or in both the mating surface of first cathode 312 and in the mating surface of second anode 318. In another aspect, fluid stream 324 may be removed through a GDL and/or flow field insert positioned between the mating surface of first cathode 312 and the mating surface of second anode 318. As known in the art, a GDL is typically a porous material, such as, carbon paper, through which gas stream 324 may pass. In another aspect, fluid stream 324 may be removed by providing one or more spacers between the mating surface of first cathode 312 and the mating surface of second anode 318 to provide a pathway for fluid stream 324. In one aspect, a source of sub-atmospheric pressure, that is, vacuum, may be introduced to draw out at least some of the second fluid stream 314 via fluid stream 324.

According to another aspect of the invention, after first fluid stream 302 is processed and passed through first MEA 306 to produce second fluid stream 314 at least some hydrogen gas may be introduced to second fluid stream 314. As shown in FIG. 8, in one aspect, hydrogen gas may be introduced to second fluid stream 314 via fluid stream 328 (shown in phantom in FIG. 8) to replace the hydrogen gas lost from second fluid stream 314 via fluid stream 324 and produce modified fluid stream 326. Though in one aspect, fluid stream 328 may be highly pure hydrogen gas, for example, having a purity to at least greater than the hydrogen content of first fluid stream 302; in other aspects, fluid stream 328 may be a hydrogen-gas containing stream having at least some hydrogen gas content, but may have a non-hydrogen gas content.

The introduction of hydrogen-containing gas stream 328 to electrolysis cell 300, for example, a "make-up gas stream," may be practiced with or without the removal of fluid stream 324. The introduction of fluid stream 328 to second fluid stream 314 may be practiced in any one or more convenient manners, for example, by introducing the hydrogen-gas containing stream 328 through electrolyte 310, which may be gas-permeable, for example, driven by a hydrogen gas partial pressure gradient, or though the gas-permeable first cathode 312, through a gas permeable GDL and/or flow field insert, or through channels in first cathode 312, channels in second anode 318 or through channels in both first cathode 312 and in second anode 318. Any channels that may be provided for hydrogen-gas containing stream 328 may be located in one or both of the opposing surfaces of first cathode 312 and second anode 318.

In one aspect, the make-up hydrogen gas stream 328 may comprise at least some of the third fluid stream 304 having a hydrogen content. For example, at least some of the third fluid stream 304 may be introduced to the second fluid stream 314 by diffusion through the second electrolyte 320, as indicated in phantom by gas stream 328A in FIG. 8. This diffusion through the second electrolyte 320 may be referred to as "back diffusion" of at least some of the third fluid stream 304 having at least some hydrogen gas (H₂). The make-up gas stream 328 may be provided by any one or more of these sources or mechanisms.

In another aspect of the invention, the three-electrode cell 150 shown in FIG. 5 may also function as an electrolyzer. For example, as shown in FIG. 5, DMEA 152 of purifier cell 150 includes a first anode 166, a first electrolyte 168, a first cathode/second anode (or "dual electrode") 170, a second electrolyte 172 and a second cathode 174. In a fashion similar to the components and operation of electrolyzer cell 250 shown in FIG. 7, in electrolyzer cell 150 shown in FIG. 5, anode 166 may have all the features of the first anodes disclosed herein; first electrolyte 168 and second electrolyte 172 may have all the features of the electrolytes disclose herein; and second cathode 174 may have all the features of the second cathodes disclosed herein. In this aspect of the invention, the components and fluid flows of electrolyzer cell 150 shown in FIG. 5 may have all the functions and characteristics of the purifier cell 150 disclosed herein, including the oxidation at first anode 166 pursuant in Equation 3 and the reduction at the second cathode 174 pursuant to Equation 4. However, for electrolyzer cell 150, first fluid stream 154 in FIG. 5 may contain liquid water and/or gaseous water (that is, steam). (It is to be understood that any reference to "fluid" herein may refer to a liquid fluid, a gaseous fluid, or both a liquid fluid and a gaseous fluid.) According to aspects of this invention, electrolyzer cell 150 of FIG. 5 may be adapted to produce a hydrogen gas stream or third fluid stream 160 having little or no gas impurities, including little or no oxygen gas.

According to aspects of the invention, one or more water electrolysis cells 250 and 300 may be provided to generate high purity hydrogen gas. In one aspect, a water electrolyze stack having one or more electrolysis cells 250 and/or 300 may be provided, for example, a water electrolysis stack similar to hydrogen purifier stack 130 shown in FIG. 4. Also, in one aspect, a water electrolyzer system having one or more electrolysis cell stacks having one or more electrolysis cells 250 and/or 300 may be provided, for example, a water electrolysis similar to hydrogen purifier system 200 shown in FIG. 6.

As disclosed above, embodiments of the present invention, in their many aspects, provide improved hydrogen purification and water electrolysis that meets, and can exceed, the hydrogen gas purities required by hydrogen gas users. Aspects of the present invention employ a unique combination of membrane electrode assemblies (MEAs) or double MEAs (DMEAs) that have shown to provide the enhanced hydrogen gas purities needed.

The terminology used herein is for the purpose of describing particular embodiments only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A water electrolyzer cell comprising:
a first membrane electrode assembly (MEA) comprising:
a first anode positioned to contact a first $H_2O$-containing fluid stream, the first anode containing a catalyst adapted to oxidize at least some of the $H_2O$ in the first $H_2O$-containing fluid stream to produce oxygen gas, hydrogen ions, and electrons;
a first electrolyte positioned and adapted to receive and transfer at least some of the hydrogen ions produced by the first anode; and
a first cathode positioned to receive at least some of the hydrogen ions transferred by the first electrolyte, the first cathode containing a catalyst adapted to reduce the at least some of the hydrogen ions to produce a second fluid stream containing hydrogen gas;
a second MEA comprising:
a second anode positioned adjacent to the first cathode to receive the second fluid stream containing hydrogen gas from the first cathode of the first MEA, the second anode containing a catalyst adapted to oxidize at least some of the hydrogen gas to produce hydrogen ions and electrons;
a second electrolyte positioned and adapted to receive and transfer at least some of the hydrogen ions produced by the second anode; and
a second cathode positioned to receive at least some of the hydrogen ions transferred by the second electrolyte of the second MEA, the second cathode containing a catalyst adapted to reduce the at least some of the hydrogen ions to produce a third fluid stream containing hydrogen gas.

2. The water electrolyzer cell as recited in claim 1, wherein the cell further comprises a channel for removing exhaust gas from the first gas stream.

3. The water electrolyzer purifier cell as recited in claim 1, wherein the cell further comprises a gas diffusion layer (GDF) associated with one of the first anode, the first cathode, the second anode, and the second cathode.

4. The water electrolyzer cell as recited in claim 1, wherein the spacing between the second anode and the first cathode is minimal.

5. The water electrolyzer cell as recited in claim 1, wherein the spacing between the second anode and the first cathode is 0.1 mm to 0.5 mm.

6. The water electrolyzer cell as recited in claim 1, wherein the second anode contacts the first cathode.

7. The water electrolyzer cell as recited in claim 1, wherein the second gas stream passes from the first cathode to the second anode without any intervening handling.

8. The water electrolyzer cell as recited in claim 1, wherein the second fluid stream passes directly from the first cathode to the second anode.

9. The water electrolyzer cell as recited in claim 8, wherein the second fluid stream passes directly from the first cathode to the second anode without passing outside of the water electrolyzer cell.

10. The water electrolyzer cell as recited in claim 1, wherein the electrolyzer cell further comprises at least one passage between the first electrolyte and the second electrolyte for discharging at least some of the second fluid stream.

11. The water electrolyzer cell as recited in claim 10, wherein the at least one passage comprises at least one channel in a surface of at least one of the first cathode and the second anode.

12. The water electrolyzer cell as recited in claim 10, wherein the cell further comprises at least one passage for introducing hydrogen-containing gas to the second fluid stream.

13. The water electrolyzer cell as recited in claim 10, wherein the at least one passage is located between the first cathode and the second anode.

14. The water electrolyzer purifier cell as recited in claim 13, wherein the at least one passage located between the first cathode and the second anode comprises voids between mating surfaces of the first cathode and the second anode.

15. The water electrolyzer cell as recited in claim 13, wherein the water electrolyzer cell further comprises a gas-permeable layer (GDL) between the first cathode and the second anode, and wherein the GDL provides the at least one passage located between the first cathode and the second anode.

16. The water electrolyzer cell as recited in claim 1, wherein the water electrolyzer cell further comprises at least one passage between the first electrolyte and the second electrolyte for introducing hydrogen-containing gas to the second fluid stream.

17. The water electrolyzer cell as recited in claim 16, wherein the cell further comprises at least one passage for discharging at least some of the second fluid stream.

18. The water electrolyzer cell as recited in claim 16, wherein the at least one passage is located between the first cathode and the second anode.

19. The water electrolyzer cell as recited in claim 18, wherein the at least one passage located between the first cathode and the second anode comprises voids between mating surfaces of the first cathode and the second anode.

20. The water electrolyzer cell as recited in claim 18, wherein the water electrolyzer cell further comprises a gas-permeable layer (GDL) between the first cathode and the second anode, and wherein the GDL provides the at least one passage located between the first cathode and the second anode.

21. A water electrolyzer stack having the water electrolyzer cell recited in claim 1.

22. A water electrolyzer system having the water electrolyzer cell recited in claim 1.

* * * * *